(12) United States Patent
Kwon et al.

(10) Patent No.: US 12,477,903 B2
(45) Date of Patent: Nov. 18, 2025

(54) DISPLAY DEVICE AND MANUFACTURING METHOD OF THE SAME

(71) Applicant: Samsung Display Co., LTD., Yongin-si (KR)

(72) Inventors: Oh June Kwon, Hwaseong-si (KR); Jeong Seok Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 503 days.

(21) Appl. No.: 17/965,926

(22) Filed: Oct. 14, 2022

(65) Prior Publication Data
US 2023/0255062 A1 Aug. 10, 2023

(30) Foreign Application Priority Data

Jan. 7, 2022 (KR) ................. 10-2022-0002743

(51) Int. Cl.
| | |
|---|---|
| *H10K 59/122* | (2023.01) |
| *H10K 50/844* | (2023.01) |
| *H10K 59/12* | (2023.01) |
| *H10K 59/35* | (2023.01) |
| *H10K 71/00* | (2023.01) |

(52) U.S. Cl.
CPC ......... *H10K 59/122* (2023.02); *H10K 50/844* (2023.02); *H10K 71/00* (2023.02); *H10K 59/1201* (2023.02); *H10K 59/351* (2023.02)

(58) Field of Classification Search
CPC ............. H10K 50/844; H10K 59/1201; H10K 59/122; H10K 59/351; H10K 71/00
See application file for complete search history.

(56) References Cited

U.S. PATENT DOCUMENTS

| | | | |
|---|---|---|---|
| 2021/0066419 A1* | 3/2021 | Byun | ..................... H10K 71/00 |
| 2022/0208904 A1* | 6/2022 | Lee | ................. H10K 59/80515 |
| 2023/0157084 A1* | 5/2023 | Roh | ....................... H10K 71/00 |
| | | | 257/40 |

FOREIGN PATENT DOCUMENTS

| | | |
|---|---|---|
| KR | 1020170080306 | 7/2017 |
| KR | 1020190029178 | 3/2019 |
| KR | 1020190057550 | 5/2019 |
| KR | 1020200051150 | 5/2020 |
| KR | 1020210028790 | 3/2021 |

* cited by examiner

*Primary Examiner* — Shaun M Campbell
(74) *Attorney, Agent, or Firm* — CANTOR COLBURN LLP

(57) ABSTRACT

A display device includes a substrate, a first electrode on the substrate, a bank layer including a pixel defining layer with an opening exposing the first electrode, and a spacer group including spacers on the pixel defining layer, a light emitting layer in the opening, and a first encapsulation layer covering the light emitting layer and the bank layer. The bank layer includes a raised portion between the spacers, and a depression portion in a lower region of opposite side surfaces of the spacers, the first encapsulation layer on the raised portion includes a top surface and a bottom surface having a less curvature than the top surface, and the first encapsulation layer includes a first portion on the depression portion and a second portion on the side surface of the spacer, a portion of the second portion is positioned outward from the first portion.

20 Claims, 18 Drawing Sheets

DISPLAY DEVICE AND MANUFACTURING METHOD OF THE SAME

This application claims priority to Korean Patent Application No. 10-2022-0002743, filed on Jan. 7, 2022, and all the benefits accruing therefrom under 35 U.S.C. § 119, the content of which in its entirety is herein incorporated by reference.

BACKGROUND

1. Field

The disclosure relates to a display device and a manufacturing method of the display device.

2. Description of the Related Art

The importance of the display device is increasing with the development of multimedia. Recently, various types of display device such as a liquid crystal display (LCD) and an organic light emitting display (OLED) are used as the display device. Among the display devices, the organic light emitting display has a wide viewing angle as a self-light emitting element, and thus is attracting attention as a next-generation display device.

Recently, techniques for bending a display panel of the display device in a rear direction have been developed to reduce a size of a bezel.

SUMMARY

In a display device where the display panel is bent to reduce a size of the bezel, peeling defects of films therein may occur due to bending stress.

Embodiments of the disclosure provide a display device having improved adhesion of an encapsulation layer.

Embodiments of the disclosure also provide a manufacturing method of the display device.

According to an embodiment of the disclosure, a display device includes a substrate, a first electrode disposed on the substrate, a bank layer including a pixel defining layer through which an opening exposing at least a portion of the first electrode is defined, and a spacer group including a plurality of spacers disposed on the pixel defining layer, a light emitting layer disposed in the opening, and first encapsulation layer covering the light emitting layer and the bank layer, where the bank layer includes a raised portion disposed between the plurality of spacers in the spacer group, and a depression portion disposed in a lower region of an opposite side surface opposite to another spacer of the spacer group among side surfaces of each spacer in the spacer group, the first encapsulation layer disposed on the raised portion includes a top surface and a bottom surface opposite to the top surface, the top surface has a greater curvature than a curvature of the bottom surface, and the first encapsulation layer includes a first portion disposed on the depression portion and a second portion disposed on the side surface of the spacer, where at least a portion of the second portion is positioned outward from the first portion.

In an embodiment, the second portion of the first encapsulation layer at least partially may cover the first portion in a plan view.

In an embodiment, the pixel defining layer and the spacer group including the plurality of spacers may be integrally formed with each other as a single unitary and indivisible par.

In an embodiment, the display device may further include a second encapsulation layer disposed on the first encapsulation layer, and a third encapsulation layer disposed on the second encapsulation layer.

In an embodiment, the raised portion may have a central portion positioned higher than one surface of the pixel defining layer positioned outside the spacer group.

In an embodiment, the raised portion may have a central portion having a height in a range of about 0.3 micrometers (μm) to about 5 μm with respect to one surface of the pixel defining layer positioned outside the spacer group.

In an embodiment, the opposite side surface opposite to another spacer of the spacer group among the side surfaces of each spacer may include a curved portion.

In an embodiment, the first encapsulation layer may have a modulus greater than a modulus of the bank layer.

In an embodiment, the second encapsulation layer may include an organic material, and the second encapsulation layer may include a tip portion protruding toward the depression portion in a space between the plurality of spacers in the spacer group.

In an embodiment, the first encapsulation layer may have a compressive stress in a range of about −500 megapascals (MPa) to about 0 MPa, or has a neutral stress of about 0 MPa.

In an embodiment, the depression portion may have a depth positioned at a same or lower position than one surface of the pixel defining layer positioned outside the spacer group.

In an embodiment, the display may further include a second electrode interposed between the bank layer and the first encapsulation layer, where the second electrode may fill the depression portion.

According to an embodiment of the disclosure, a display device include a substrate defining a plurality of emission regions and a non-emission region surrounding the emission regions, where the plurality of emission regions is arranged along a first direction and a second direction intersecting the first direction, and the non-emission region includes a first extension portion extending along the first direction around the emission region, a second extension portion extending along the second direction around the emission region, and an intersection portion where the first extension portion and the second extension portion intersect, a bank layer disposed on the substrate and including a pixel defining layer covering the non-emission region and a plurality of spacers disposed on the pixel defining layer at the intersection portion, and an inorganic layer disposed on the bank layer. In such an embodiment, the bank layer includes a raised portion disposed between the plurality of spacers of the intersection portion, and a depression portion disposed in a lower region of a side surface opposite to another spacer among side surfaces of each spacer, the inorganic layer includes a first portion disposed on the depression portion and a second portion disposed on the opposite side surface of the spacer, and at least a portion of the second portion is positioned outward from the first portion.

In an embodiment, the plurality of spacers may be disposed in a matrix shape along a first direction and a second direction in a plan view at the intersection portion.

In an embodiment, the raised portion may include a first raised portion and a second raised portion may be positioned between the plurality of spacers spaced apart from each other along the first direction and the second direction in a plan view, and a third raised portion positioned between the plurality of spacers spaced apart from each other along a diagonal direction intersecting the first direction and the second direction in the plan view, where heights of a central portion of the first raised portion and a central portion of the second raised portion may be the same as each other, and a center portion of the third raised portion may have a height higher than the heights of the center portion of the first raised portion and the center portion of the second raised portion.

In an embodiment, an interval between the plurality of spacers may be in a range of about 0.5 μm to about 8 μm.

In an embodiment, the plurality of spacers may have different sizes from each other, and the plurality of spacers may include a curved shape in a plan view.

According to another embodiment of the disclosure, a manufacturing method of a display device includes preparing a substrate, providing a first electrode on the substrate, providing a bank layer on the substrate, where the bank layer includes a pixel defining layer through which an opening exposing at least a portion of the first electrode is formed, and a spacer group including a plurality of spacers on the pixel defining layer, providing a light emitting layer disposed in the opening, and providing a first encapsulation layer on the substrate to cover the light emitting layer and the bank layer. In such an embodiment, the bank layer includes a raised portion disposed between the plurality of spacers in the spacer group, and a depression portion disposed in a lower region of an opposite side surface opposite to another spacer of the spacer group among side surfaces of each spacer.

In an embodiment, the providing the first encapsulation layer may be performed by a chemical vapor deposition method.

In an embodiment, the manufacturing method of a display device may further include providing a second encapsulation layer on the first encapsulation layer, and providing a third encapsulation layer disposed on the second encapsulation layer.

According to embodiments of the display device, as described herein, the adhesion of the encapsulation layer may be improved, and thus the reliability of the display device may be improved.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
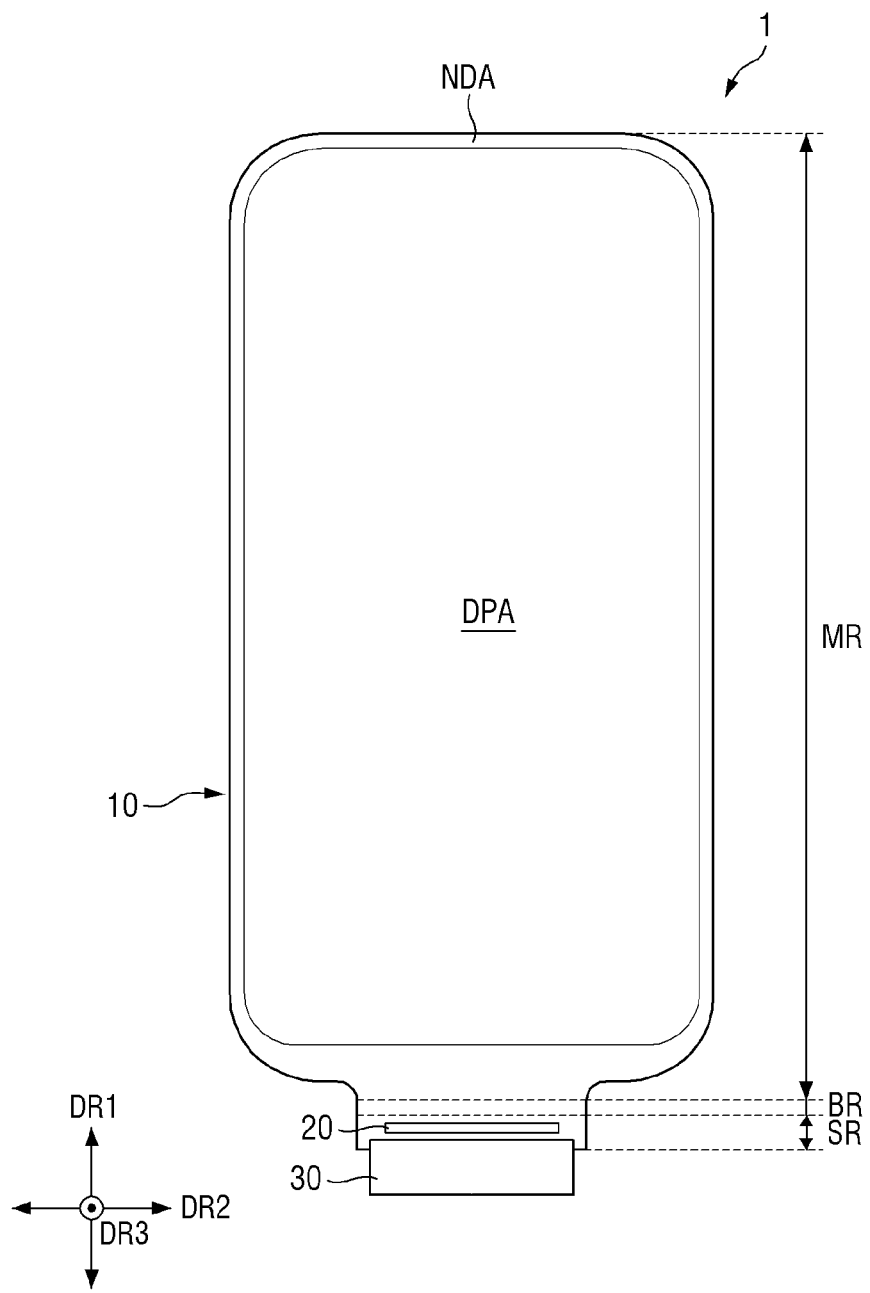
FIG. 1 is a plan view of a display device according to an embodiment.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when a layer is referred to as being "on" another layer or substrate, it can be directly on the other layer or substrate, or intervening layers may be present therebetween. In contrast, when an element is referred to as being "directly on" another element, there are no intervening elements present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
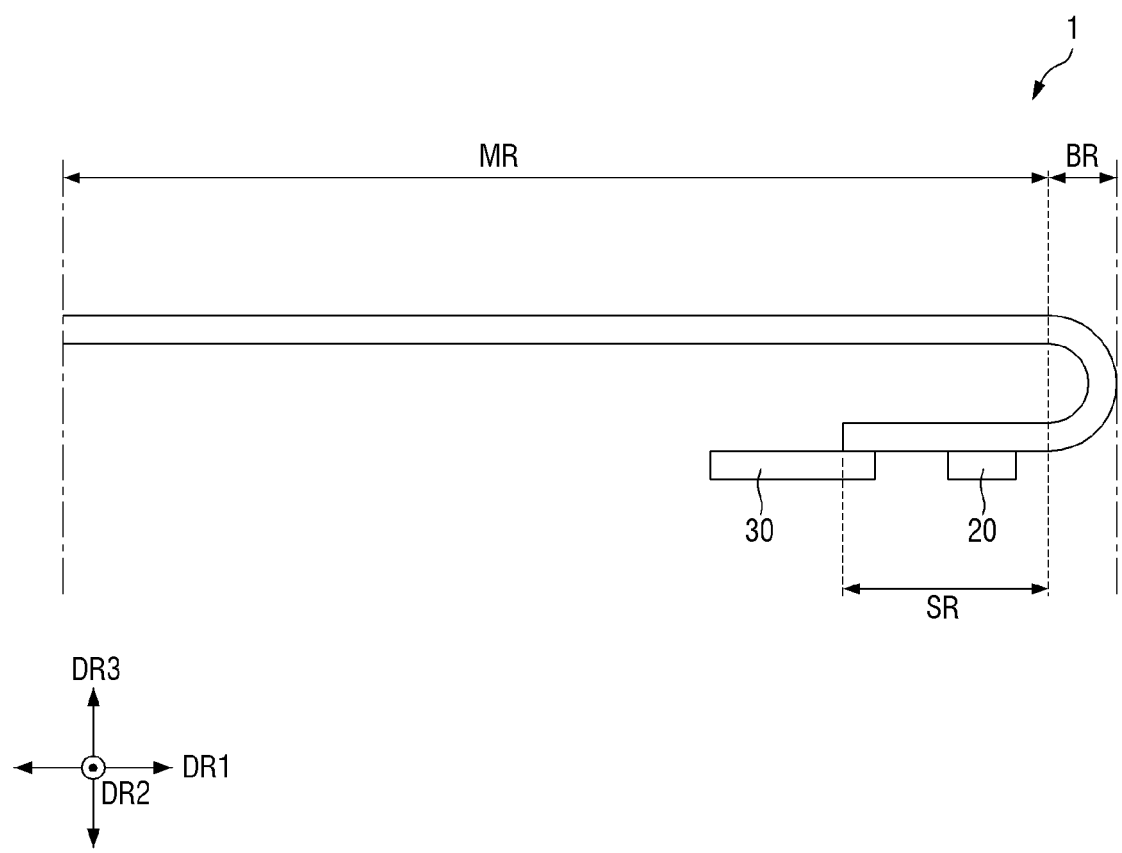
FIG. 2 is a cross-sectional view of the display device according to an embodiment.

FIG. 1 is a plan view of a display device according to an embodiment. FIG. 2 is a cross-sectional view of the display device according to an embodiment.

In the plan view of FIG. 1, up, down, left, and right directions are defined for convenience of explanation. An up-down direction is defined as a first direction DR1 in a height or column direction, a left-right direction is defined as a second direction DR2 in a width or row direction, and a vertical direction is defined as a third direction DR3. In the specification, the terms "upper edge", "lower edge", "left edge", and "right edge" of a spacer or the like refer to edges or ends respectively located on the upper, lower, left, and right sides of the spacer or the like in the plan view. It would be understood that the directions mentioned in the embodiments refer to relative directions, and the embodiments are not limited to the mentioned directions.

Referring to FIGS. 1 and 2, an embodiment of a display device 1 is a device that displays a moving image or a still image, and may be used as a display screen of each of various products such as televisions, laptop computers, monitors, billboards, and Internet of Things (JOT) as well as portable electronic devices such as mobile phones, smartphones, tablet personal computers (PCs), smartwatches, watch phones, mobile communication terminals, electronic organizers, electronic books, portable multimedia players (PMPs), navigation devices, and ultra mobile PCs (UMPCs). In an embodiment, the display device 1 may be an organic light emitting display device, a liquid crystal display device, a plasma display device, a field emission display device, an electrophoretic display device, an electrowetting display device, a quantum dot light emitting display device, a micro light emitting diode (LED) display device, or the like. Hereinafter, for convenience of description, embodiments where the display device 1 is an organic light emitting display will be described in detail, but the embodiments are not limited thereto.

In an embodiment, the display device 1 may include a display panel 10. The display panel 10 may include a flexible substrate SUB including a flexible polymer material such as polyimide. Accordingly, the display panel 10 may be curved, bent, folded, or rolled.

The display panel 10 may include a main region MR and a panel bending region BR connected to one side of the main region MR. The display panel 10 may further include a sub-region SR connected to the panel bending region BR and overlapping the main region MR in a thickness direction or the third direction DR3.

In an embodiment, a portion of the display panel 10 that displays a screen is defined as a display unit DPA and a portion thereof that does not display a screen is defined as a non-display unit NDA, and the display unit DPA of the display panel 10 is disposed in the main region MR. The remaining portion except for the display unit DPA is the non-display unit NDA of the display panel 10, and in an embodiment, a peripheral edge portion of the display unit DPA in the main region MR, an entirety of the panel bending region BR, and an entirety of the sub-region SR may be the non-display unit NDA. However, the disclosure is not limited thereto, and the panel bending region BR and/or the sub-region SR may also include the display unit DPA.

The main region MR may have a shape substantially similar to a shape of the display device 1 in a plan view. The main region MR may be a flat region positioned on a plane. However, the main region MR is not limited thereto, and at least one edge of the remaining edges other than an edge (side) of the main region MR connected to the panel bending region BR may be bent to form a curved surface or may be bent in a vertical direction or in the third direction DR3.

The display unit DPA of the display panel 10 may be disposed in a central portion of the main region MR. The display unit DPA may include a plurality of pixels. Each pixel may include a light emitting layer and a circuit layer for controlling an amount of light emitted from the light emitting layer. The circuit layer may include a display wiring, a display electrode, and at least one transistor. The light emitting layer may include an organic light emitting material. The light emitting layer may be sealed by an encapsulation layer. Each pixel will be described later in greater detail.

The display unit DPA may have a rectangular shape or a rectangular shape with rounded corners. However, the display unit DPA is not limited thereto, and may have various shapes such as a square, other polygons, a circle, or an oval.

In an embodiment where at least one edge of the remaining edges other than the edge (side) of the main region MR connected to the panel bending region BR forms a curved surface or is bent, the display unit DPA may also be disposed on the corresponding edge. However, the disclosure is not limited thereto, and the non-display unit NDA that does not display a screen may be disposed on the curved or bent edge, or the display unit DPA and the non-display unit NDA may be disposed together thereon.

The non-display unit NDA may be positioned around the display unit DPA in the main region MR. The non-display unit NDA of the main region MR may be disposed in a region from an outer boundary of the display unit DPA to an edge of the display panel 10. Signal lines or driving circuits for applying signals to the display unit DPA may be disposed in the non-display unit NDA of the main region MR.

The panel bending region BR is connected to the main region MR. In an embodiment, for example, the panel bending region BR may be connected to the main region MR through one end of the main region MR. A width (or length in the second direction DR2) of the panel bending region BR may be smaller than a width (a width of a short side) of the main region MR. A connection portion between the main region MR and the panel bending region BR may have an L-shaped cut shape.

In the panel bending region BR, the display panel 10 may be bent with a curvature in a downward direction in the thickness direction, that is, in a direction opposite to a display surface. The panel bending region BR may have a constant radius of curvature but is not limited thereto, and alternatively, the panel bending region BR may have a different radius of curvature for each section. As the display panel 10 is bent in the panel bending region BR, the surface of the display panel 10 is inverted. That is, one surface of the display panel facing an upper side may be changed to face an outside through the panel bending region BR and then to face a lower side again. As the display panel 10 is bent in the panel bending region BR, the size and radius of curvature of a bezel may be reduced to reduce a dead space, but a peeling force to the encapsulation layer or the like may act due to bending stress in the panel bending region BR. As will be described later, the display panel 10 according to an embodiment may include at least two or more spacers SC, raised portions UP, and depression portions DP in a non-emission region NEM, thereby effectively preventing peeling of an encapsulation layer ENL. The spacer SC, the raised portion UP, and the depression portion DP will be described later in greater detail.

The sub-region SR extends from the panel bending region BR. The sub-region SR may extend in a direction parallel to the main region MR starting after bending is completed. The sub-region SR may overlap the main region MR in the thickness direction of the display panel 10. The sub-region SR may overlap the non-display unit NDA of the edge of the main region MR and further overlap the display unit DPA of the main region MR.

A width of the sub-region SR in the second direction DR2 may be the same as the width of the panel bending region BR in the second direction DR2, but is not limited thereto.

The driving chip 20 may be disposed on the sub-region SR of the display panel 10. The driving chip 20 may include an integrated circuit that drives the display panel 10. In an embodiment, the integrated circuit may be a data driving integrated circuit that generates and provides a data signal, but is not limited thereto. The driving chip 20 may be mounted on the display panel 10 in the sub-region SR. The driving chip 20 is mounted on one surface of the display panel 10 which is the same surface as the display surface and is mounted on the surface of the display panel 10 facing downward in the thickness direction as the panel bending region BR is bent and inverted as described above, so that a top surface of the driving chip 20 may face downward.

The driving chip 20 may be attached to the display panel 10 through an anisotropic conductive film or may be attached to the display panel 10 through ultrasonic bonding. A width of the driving chip 20 in a width direction (or the second direction DR2) may be smaller than a width of the display panel 10 in the width direction. The driving chip 20 may be disposed in a central portion of the sub-region SR in the width direction, and a left edge and a right edge of the driving chip 20 may be spaced apart from a left edge and a right edge of the sub-region SR, respectively.

A pad portion (not shown) may be provided at an end of the sub-region SR of the display panel 10, and a display driving substrate 30 may be connected to the pad portion. The display driving substrate 30 may be a flexible printed circuit board or a film.

A plurality of signal lines may be disposed in the sub-region SR, the panel bending region BR, and the main region MR. The signal lines may extend from the sub-region SR to the main region MR through the panel bending region BR.

Figure 3:
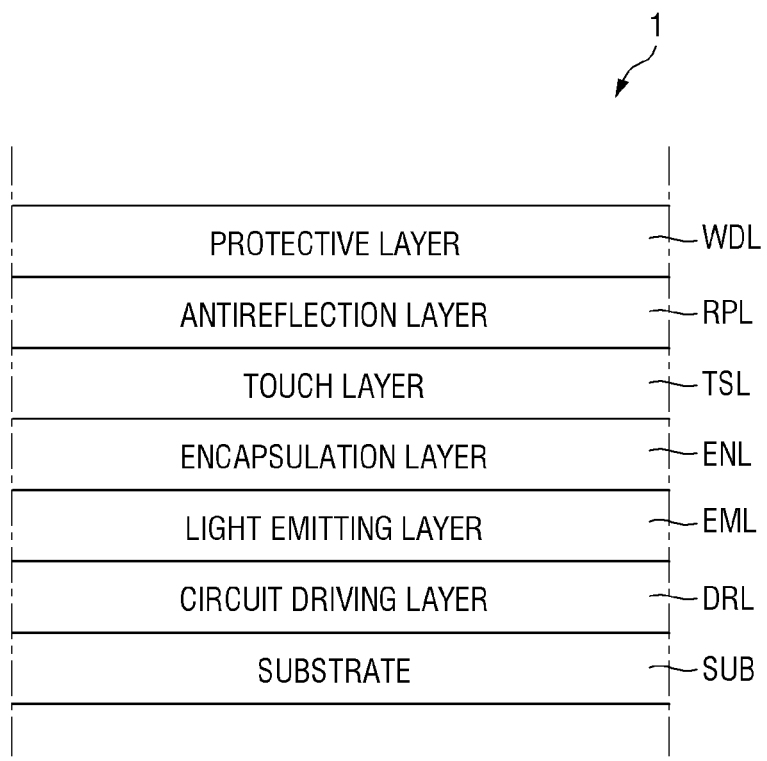
FIG. 3 is a schematic cross-sectional view illustrating an example of a stacked structure of a display panel according to an embodiment.

FIG. 3 is a schematic cross-sectional view illustrating an example of a stacked structure of a display panel according to an embodiment.

Referring to FIG. 3, an embodiment of the display panel 10 may include a substrate SUB, a circuit driving layer DRL, a light emitting layer EML, an encapsulation layer ENL, a touch layer TSL, an antireflection layer RPL, and a protective layer WDL that are sequentially stacked one on another.

A substrate SUB may support components disposed thereon.

A circuit driving layer DRL may be disposed on the substrate SUB. The circuit driving layer DRL may include a circuit for driving the light emitting layer EML of the pixel. The circuit driving layer DRL may include a plurality of thin film transistors.

A light emitting layer EML may be disposed on the circuit driving layer DRL. The light emitting layer EML may include an organic light emitting layer. The light emitting layer EML may emit light with various luminances based on a driving signal transmitted from the circuit driving layer DRL.

An encapsulation layer ENL may be disposed on the light emitting layer EML. In an embodiment, for example, the encapsulation layer ENL may include an inorganic layer or a stacked layer of an inorganic layer and an organic layer. In an alternative embodiment, for example, the encapsulation layer ENL may include glass or an encapsulation film.

A touch layer TSL may be disposed on the encapsulation layer ENL. The touch layer TSL, which is a layer that recognizes a touch input, may function as a touch member. The touch layer TSL may include a plurality of sensing regions and sensing electrodes.

An antireflection layer RPL may be disposed on the touch layer TSL. The antireflection layer RPL may serve to reduce reflection of external light. The antireflection layer RPL may include a layer in the form of a polarizing film. The antireflection layer RPL may be omitted. In an alternative embodiment, the display panel 10 may include a color filter layer instead of the antireflection layer RPL. In such an embodiment, the antireflection layer RPL may include a color filter that selectively transmits light of a specific wavelength, or the like.

A protective layer WDL may be disposed on the antireflection layer RPL. The protective layer WDL may include, for example, a window member. The protective layer WDL may be attached onto the antireflection layer RPL by an optically transparent adhesive or the like.

Figure 4:
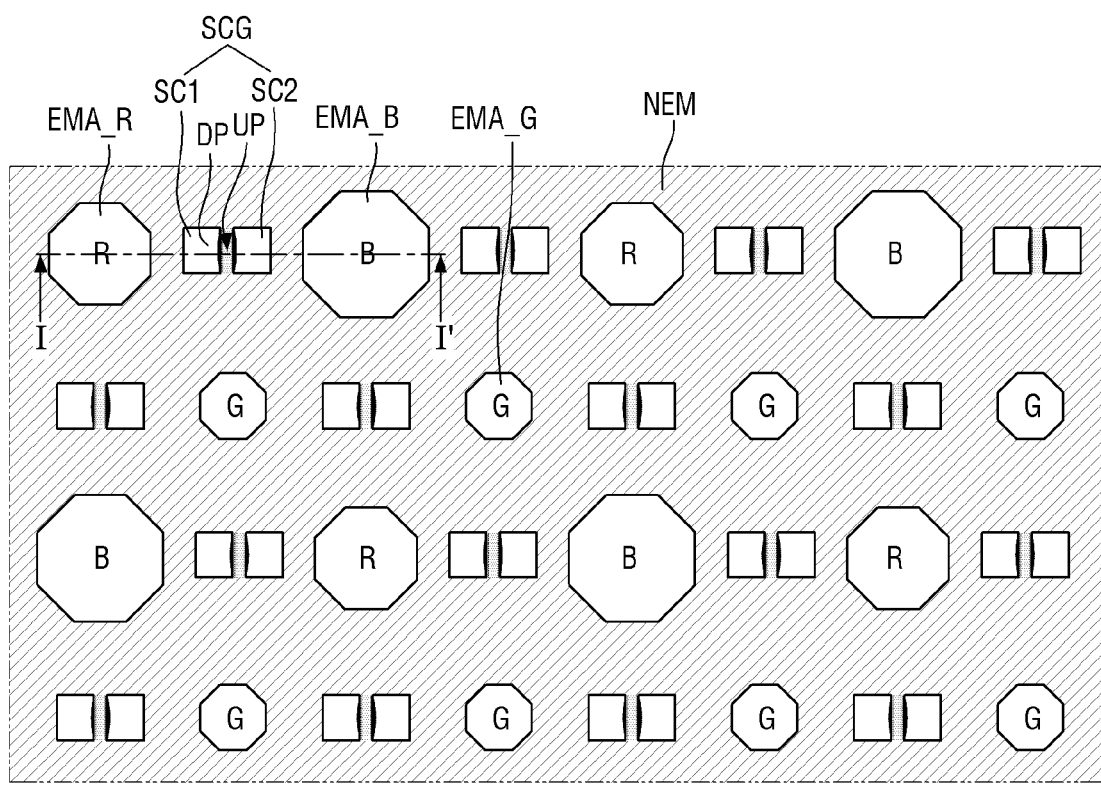
FIG. 4 is a schematic plan view of a display unit of the display device of FIG. 1.
Figure 4:
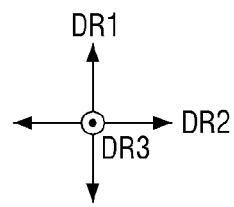

FIG. 4 is a schematic plan view of a display unit of the display device of FIG. 1.

The display unit DPA includes a plurality of pixels. Each pixel includes an emission region EMA_R, EMA_B or EMA_G.

The pixel may include a first color pixel, a second color pixel, and a third color pixel. Each color pixel may be arranged in various ways. In an embodiment, the first color pixel (e.g., a red pixel) and the second color pixel (e.g., a blue pixel) are alternately arranged along a first row in the second direction DR2, and the third color pixel (e.g., a green pixel) may be arranged along a second row in the second direction DR2 and adjacent to the first row in the first direction DR1. The pixels in the second row may be alternately disposed in the second direction DR2 with respect to the pixels in the first row. The number of third color pixels in the second row may be twice the number of first or second color pixels in the first row. The arrangement of the first row and the second row may be repeated along the first direction DR1.

A size of the emission region EMA_R, EMA_B or EMA_G in each color pixel may be different. In an embodiment, for example, a size of an emission region EMA_B of the second color pixel may be larger than a size of an emission region EMA_R of the first color pixel, and a size of an emission region EMA_G of the third color pixel may be smaller than the size of the emission region EMA_R of the first color pixel.

A shape of the emission region EMA of each color pixel may be substantially octagonal. However, the shape of each emission region EMA_R, EMA_B and EMA_G is not limited thereto, and alternatively, may be a circle, a rhombus, other polygons, or a polygon with rounded corners.

A non-emission region NEM may be disposed between the emission regions EMA_R, EMA_B or EMA_G of each pixel and may surround the emission region EMA_R, EMA_B or EMA_G.

The non-emission region NEM may be disposed along a diagonal direction intersecting the first direction DR1 and the second direction DR2 in a plan view and may include an intersection portion where the non-emission region NEM disposed along the first direction DR1 and the non-emission region NEM disposed along the second direction DR2 intersect each other.

A spacer group SCG may be disposed in the non-emission region NEM, and each spacer group SCG may include at least two or more spacers SC disposed adjacent to each other.

A plurality of spacer groups SCG may be disposed in an island shape in a plan view in a region where a portion of the non-emission region NEM extending in the first diagonal direction and a portion thereof extending in the second diagonal direction intersect each other. That is, the plurality of spacer groups SCG may be disposed in a region where the non-emission region NEM between the first color pixels (e.g., red pixels) and/or the non-emission region NEM between the second color pixels (e.g., blue pixels) and the non-emission region NEM between the third color pixels (e.g., green pixels) intersect.

The plurality of spacer groups SCG may not be disposed in all the intersecting regions. In an embodiment, as illustrated in FIG. 4, the spacer groups SCG are disposed the non-emission region NEM between every four adjacent pixels in the first direction DR1 and the second direction DR2, that is, four adjacent pixels in a diamond shape or every two adjacent pixels in the first direction DR1 or the second direction DR2. However, the disclosure is not limited thereto, and alternatively, the spacer group SCG may be additionally disposed in the non-emission region NEM between the pixels disposed in the first row and the pixels disposed in the second row alternately in the first row, that is, in the non-emission region NEM between adjacent pixels in the diagonal direction.

According to an embodiment, the spacer groups SCG are arranged side by side in the second direction DR2 in the region where the non-emission region NEM overlaps, but the disclosure is not limited thereto. In an embodiment, for example, each spacer group SCG disposed in the non-emission region NEM includes at least two or more spacer groups SCG, and the spacers SC included in a spacer group SCG may be arranged in a matrix form, or some of the spacers SC included in the spacer group SCG may be arranged in the second direction DR2, and some of the spacers SC included in the spacer group SCG may be arranged in the first direction DR1.

Distances between the respective pixels may be different from each other due to a difference in size of each of the pixels included in the display unit DPA. Accordingly, the number of spacer groups SCG disposed in each non-emission region NEM and a distance between the spacers SC included in each spacer group SCG may be different from each other.

In an embodiment, where the first color pixel (e.g., a red pixel) and the second color pixel (e.g., a blue pixel) are larger than the third color pixel (e.g., a green pixel), a distance between the third color pixels may be longer than a distance between the first color pixels and a distance between the first color pixels and the second color pixels.

In such an embodiment, the non-emission region NEM between the third color pixels may include a larger number of spacer groups SCG than the non-emission region NEM between the first color pixels and the non-emission region NEM between the second color pixels. However, the disclosure is not limited thereto.

According to an embodiment, each spacer SC may have a quadrangular shape in a plan view and may have a same size as each other, but is not limited thereto. In an alternative embodiment, for example, the size of each spacer SC disposed in the non-emission region NEM may be different from each other, and the shape thereof in a plan view may include a curved portion.

A distance between the respective spacers SC included in the spacer group SCG disposed in the non-emission region NEM between the respective pixels may be shorter than a distance between a spacer SC in the spacer group SCG and a pixel adjacent thereto.

According to an embodiment, the distance between the respective spacers SC may have a value less than ½ of the distance between the spacer SC and the pixel adjacent thereto, and a distance between the spacers SC disposed adjacent to each other may be in a range about 0.5 micrometers (μm) to about 8 μm. However, the disclosure is not limited thereto.

In an embodiment, where the pixel have different sizes from each other, the distance between the spacer SC and the pixel may be different depending on the type of pixel adjacent to the spacer SC.

A region between the spacers SC disposed in the non-emission region NEM between the respective pixels may include a raised portion UP protruding in the third direction DR3, and depression portions DP depressed in the third direction DR3 in the lower regions of the opposite side surface portions of the spacers SC disposed side by side in the second direction DR2.

The raised portion UP disposed between the spacers SC adjacent to each other and the depression portions DP included in the lower regions of the opposite side surfaces of the spacers SC adjacent to each other will be described later in detail.

Hereinafter, a detailed stacked structure of the display panel 10 according to an embodiment will be described with reference to FIG. 5.

Figure 5:
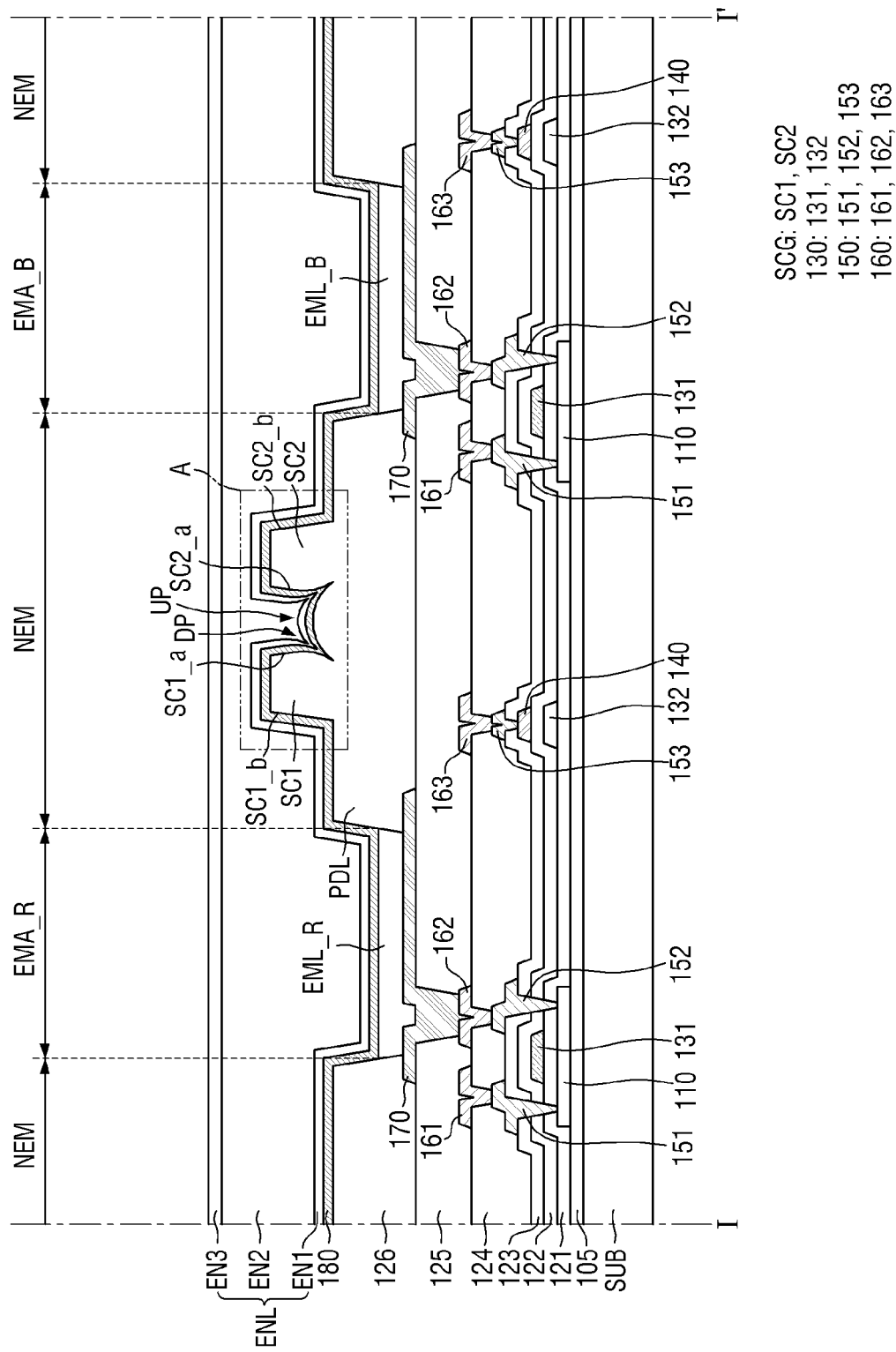
FIG. 5 is a cross-sectional view taken along line I-I' of FIG. 4.

FIG. 5 is a cross-sectional view taken along line I-I' of FIG. 4.

Referring to FIG. 5, the display panel 10 according to an embodiment may include a substrate SUB, a buffer layer 105, a semiconductor layer 110, a first insulating layer 121, a first conductive layer 130, a second insulating layer 122, a second conductive layer 140, a third insulating layer 123, a third conductive layer 150, a fourth insulating layer 124, a fourth conductive layer 160, a fifth insulating layer 125, a fifth conductive layer 170, a pixel defining layer PDL through which an opening exposing the fifth conductive layer 170 is defined, a bank layer 126 including a spacer group SCG including a plurality of spacers SC disposed on the pixel defining layer PDL, a light emitting layer EML disposed in the opening of the pixel defining layer PDL, a sixth conductive layer 180 disposed on the light emitting layer EML and the pixel defining layer PDL, and an encapsulation layer ENL disposed on the sixth conductive layer 180.

Each of the above-described layers may be formed as a single layer (or have a single layer structure) or may also be formed as a stacked layer (or have a multilayer structure) including a plurality of layers. Another layer may also be further disposed between the respective layers.

The substrate SUB may support each layer disposed thereon, and the substrate SUB may include or be made of an insulating material such as a polymer resin. Examples of the polymer material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or combinations thereof. The substrate SUB may be a flexible substrate that may be bent, folded, and rolled. A material constituting or included in the flexible substrate may be, for example, polyimide (PI), but is not limited thereto.

A buffer layer 105 is disposed on the substrate SUB. The buffer layer 105 may prevent diffusion of impurity ions, prevent permeation of moisture or outside air, and perform a surface planarization function. The buffer layer 105 may include silicon nitride, silicon oxide, or silicon oxynitride. Alternatively, the buffer layer 105 may be omitted depending on the type or process conditions of the substrate SUB.

A semiconductor layer 110 is disposed on the buffer layer 105. The semiconductor layer 110 forms a channel of a thin film transistor of the pixel. The semiconductor layer 110 may include polycrystalline silicon. However, the disclosure is not limited thereto, and the semiconductor layer 110 may also include single crystal silicon, amorphous silicon, or an oxide semiconductor. The oxide semiconductor may include at least one selected from a binary compound (ABx), a ternary compound (ABxCy), and a quaternary compound (ABxCyDz) including, for example, indium, zinc, gallium, tin, titanium, aluminum, hafnium (Hf), zirconium (Zr), magnesium (Mg), or the like.

A first insulating layer 121 is disposed on the semiconductor layer 110 and may be generally disposed over the entire surface of the substrate SUB. The first insulating layer 121 may be a gate insulating layer having a gate insulating function. The first insulating layer 121 may include a silicon compound, a metal oxide, or the like. In an embodiment, for example, the first insulating layer 121 may include silicon oxide, silicon nitride, silicon oxynitride, aluminum oxide, tantalum oxide, hafnium oxide, zirconium oxide, titanium oxide, or the like. These oxides may be used alone or in combination with each other. The first insulating layer 121 may be a single layer or a multilayer including stacked layers of different materials.

A first conductive layer 130 is disposed on the first insulating layer 121. The first conductive layer 130 may be a first gate conductive layer. The first conductive layer 130 may include a gate electrode 131 of the thin film transistor of the pixel, a scan line connected to the gate electrode 131, and a first electrode 132 of the maintaining capacitor.

The first conductive layer 130 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first conductive layer 130 may be a single layer or a multilayer.

A second insulating layer 122 may be disposed on the first conductive layer 130. The second insulating layer 122 may be an interlayer insulating layer. The second insulating layer 122 may include an inorganic insulating material such as silicon oxide, silicon nitride, silicon oxynitride, hafnium oxide, aluminum oxide, titanium oxide, tantalum oxide, or zinc oxide.

A second conductive layer 140 is disposed on the second insulating layer 122. The second conductive layer 140 may be a second gate conductive layer. The second conductive layer 140 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The second conductive layer 140 may include or be made of the same material as the first conductive layer 130 but is not limited thereto. The second conductive layer 140 may be a single layer or a multilayer.

A third insulating layer 123 is disposed on the second conductive layer 140. The third insulating layer 123 may be an interlayer insulating layer. The third insulating layer 123 may include an inorganic insulating material such as silicon oxide, silicon nitride, silicon oxynitride, hafnium oxide, aluminum oxide, titanium oxide, tantalum oxide, or zinc oxide, or an organic insulating material such as a polyacrylates resin, an epoxy resin, a phenolic resin, a polyamides resin, a polyimides resin, an unsaturated polyesters resin, a polyphenylethers resin, a polyphenylenesulfides resin, or benzocyclobutene (BCB). The third insulating layer 123 may be a single layer or a multilayer including stacked layers of different materials.

A third conductive layer 150 is disposed on the third insulating layer 123. The third conductive layer 150 may be a first source/drain conductive layer. The third conductive layer 150 may include a first electrode 151 and a second electrode 152 of the thin film transistor of the pixel. The first electrode 151 and the second electrode 152 of the thin film transistor may be electrically connected to a source region and a drain region of the semiconductor layer 110 through contact holes defined through the third insulating layer 123, the second insulating layer 122, and the first insulating layer 121.

The third conductive layer 150 may include at least one metal selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The third conductive layer 150 may be a single layer or a multilayer. In an embodiment, for example, the third conductive layer 150 may be formed in or defined by a stacked structure of Ti/Al/Ti, Mo/Al/Mo, Mo/AlGe/Mo, Ti/Cu, or the like.

A four insulating layer 124 is disposed on the third conductive layer 150. The fourth insulating layer 124 may cover both the third insulating layer 123 and the third conductive layer 150 and may be disposed on front surfaces thereof. The fourth insulating layer 124 may be a via layer including an organic material.

The fourth insulating layer 124 may include an organic insulating material such as a polyacrylates resin, an epoxy resin, a phenolic resin, a polyamides resin, a polyimides resin, an unsaturated polyesters resin, a poly phenyleneethers resin, a polyphenylenesulfides resin, or benzocyclobutene (BCB).

A fourth conductive layer 160 is disposed on the fourth insulating layer 124. The fourth conductive layer 160 may be a second source/drain conductive layer. The fourth conductive layer 160 may include a data line 161 of a pixel, a connection electrode 162, and a first power voltage line 163. The data line 161 may be electrically connected to the first electrode 151 of the thin film transistor of the pixel through a contact hole defined through the fourth insulating layer 124 in the pixel. The connection electrode 162 may be electrically connected to the second electrode 152 of the thin film transistor of the pixel through the contact hole defined through the fourth insulating layer 124. The first power voltage line 163 may be electrically connected to a first power voltage electrode 153 through the contact hole defined through the fourth insulating layer 124.

The fourth conductive layer 160 may include at least one metal selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The fourth conductive layer 160 may be a single layer or a multilayer. The fourth conductive layer 160 may include or be made of the same material as the third conductive layer 150 but is not limited thereto.

A fifth insulating layer 125 is disposed on the fourth conductive layer 160. The fifth insulating layer 125 may cover an entirety of the fourth conductive layer 160 and be disposed on a front surface of the substrate SUB. The fifth insulating layer 125 may be a via layer.

The fifth insulating layer 125 may include a same material as the above-described fourth insulating layer 124 or may include at least one material selected from the materials listed above as the constituent materials of the fourth insulating layer 124.

A fifth conductive layer 170 is disposed on the fifth insulating layer 125. An anode electrode of the pixel may be formed of the fifth conductive layer 170. The anode electrode may be electrically connected to the connection electrode 162 including or made of the fourth conductive layer 160 through a contact hole defined through the fifth insulating layer 125 and may be connected to the second electrode 152 of the thin film transistor through the connection electrode 162.

The fifth conductive layer 170 may have a stacked layer structure in which a material layer having a high work function, including or made of indium-tin-oxide (ITO), indium-zinc-oxide (IZO), zinc oxide (ZnO), or indium oxide ($In_2O_3$) and a reflective material layer made of silver (Ag), magnesium (Mg), aluminum (Al), platinum (Pt), lead (Pb), gold (Au), nickel (Ni), neodymium (Nd), iridium (Ir), chromium (Cr), lithium (Li), calcium (Ca), or mixtures thereof are stacked, but is not limited thereto. The layer having the high work function may be disposed on a layer above the reflective material layer to be disposed close to the light emitting layer EML. The fifth conductive layer 170 may have a multilayer structure of ITO/Mg, ITO/MgF, ITO/Ag, and ITO/Ag/ITO, but is not limited thereto.

A bank layer 126 may be disposed on the fifth conductive layer 170. The bank layer 126 may include a pixel defining layer PDL and a spacer group SCG including a plurality of spacers SC disposed on the pixel defining layer PDL.

The pixel defining layer PDL is disposed on the fifth conductive layer 170 and an opening may be defined through the pixel defining layer PDL to expose the fifth conductive layer 170. The emission region EMA and the non-emission region NEM may be divided by the pixel defining layer PDL and the opening thereof.

The pixel defining layer PDL may include an organic insulating material such as a polyacrylates resin, an epoxy resin, a phenolic resin, a polyamides resin, a polyimides resin, an unsaturated polyesters resin, a polyphenyleneethers resin, a polyphenylenesulfides resin, or benzocyclobutene (BCB). However, the disclosure is not limited thereto, and alternatively, the pixel defining layer PDL may include an inorganic material.

The spacer group SCG including the plurality of spacers SC may be disposed on the pixel defining layer PDL disposed in the non-emission region NEM. The plurality of spacers SC may include a first spacer SC1 and a second spacer SC2 disposed adjacent to each other. The first spacer SC1 and the second spacer SC2 may be disposed to be spaced apart from each other in a horizontal direction (the second direction DR2 of FIG. 4).

In an embodiment, the spacer SC may be disposed on at least a partial region of the pixel defining layer PDL, may have a width smaller than that of the pixel defining layer PDL, and may protrude in the thickness direction.

The spacer SC may serve to maintain a distance of a structure disposed therebelow from a structure disposed thereon. Although not limited thereto, for example, the spacer SC may prevent a defect such as being engraved on the display panel 10 by a fine metal mask (FMM).

In an embodiment, the spacer SC may include an organic insulating material as the pixel defining layer PDL. In an embodiment, the pixel defining layer PDL and the spacer SC are integrally formed with each other as a single unitary an indivisible part using a same material, but the disclosure is not limited thereto. In an alternative embodiment, the pixel defining layer PDL and the spacer SC may be formed in a stacked structure in which the pixel defining layer PDL is made of a first insulating material and the spacer SC is made of a second insulating material.

The first spacer SC1 and the second spacer SC2 may include opposite inclined surfaces SC1_a and SC2_a that face each other and the other inclined surfaces SC1_b and SC2_b that do not face each other. The opposite inclined surfaces SC_a and SC2_a of the first spacer SC1 and the second spacer SC2 may partially include a curved surface, and the other inclined surfaces SC1_b and SC2_B thereof may include a forward tapered inclined surface. However, the disclosure is not limited thereto, and alternatively, the other inclined surfaces SC1_b and SC2_b of the first spacer SC1 and the second spacer SC2 may include a reverse tapered inclined surface or a curved inclined portion.

In an embodiment, the first spacer SC1 and the second spacer SC2 may have a same height as each other, but the disclosure is not limited thereto, and alternatively, heights of top surfaces of the first spacer SC1 and the second spacer SC2 may be different from each other.

A top surface of the pixel defining layer PDL is substantially uniform or flat but may include a raised portion UP protruding in the thickness direction and depression portions DP depressed in the thickness direction.

Referring to FIG. 5, a top surface of a portion of the pixel defining layer PDL positioned between the first spacer SC1 and the second spacer SC2 may include a raised portion UP having a curved surface having a convex shape in the thickness direction and may be positioned higher than a top surface of an adjacent portion of the pixel defining layer PDL.

In an embodiment, the top surface of the portion of the pixel defining layer PDL positioned between the first spacer SC1 and the second spacer SC2 may include depression portions DP depressed in the thickness direction at portions where the top surface of the portion of the pixel defining layer PDL positioned between the first spacer SC1 and the second spacer SC2 and the opposite inclined surfaces SC1_a and SC2_a of the spacer SC1 and the second spacer SC2 meet each other.

In such an embodiment, adhesion of the encapsulation layer ENL may be improved by the raised portion UP and the depression portions DP, and reliability of the display panel or the display device 1 may be improved.

The light emitting layer EML is disposed on the fifth conductive layer 170 exposed by the pixel defining layer PDL. The light emitting layer EML may include an organic material layer. The organic material layer of the light emitting layer may include an organic light emitting layer and may further include a hole injection/transport layer and/or an electron injection/transport layer.

A sixth conductive layer 180 is disposed on the light emitting layer EML. A cathode electrode may be formed of or defined by the sixth conductive layer 180. The cathode electrode CAT may be disposed over the entirety of the emission region EMA and the non-emission region NEM. The sixth conductive layer 180 may include a material layer having a small work function, such as Li, Ca, LiF/Ca, LiF/Al, Al, Mg, Ag, Pt, Pd, Ni, Au, Nd, Ir, Cr, BaF, Ba, or compounds or mixtures thereof (e.g., a mixture of Ag and Mg, etc.). The sixth conductive layer 180 may further include a transparent metal oxide layer disposed on the material layer having the small work function.

An encapsulation layer ENL including a first encapsulation layer EN1, a second encapsulation layer EN2, and a third encapsulation layer EN3 is disposed on the sixth conductive layer 180. At an end of the encapsulation layer ENL, the first encapsulation layer EN1 and the third encapsulation layer EN3 may be in contact with each other. The second encapsulation layer EN2 may be sealed by the first encapsulation layer EN1 and the third encapsulation layer EN3.

Each of the first encapsulation layer EN1 and the third encapsulation layer EN3 may include an inorganic material. Although not limited thereto, the inorganic material may include, for example, at least one material selected from silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride (SiON).

In an embodiment, the first encapsulation layer EN1 may have compressive stress, and the first encapsulation layer EN1 may have a compressive stress value of about −500 megapascals (MPa) or more and less than 0 MPa.

In an embodiment, the first encapsulation layer EN1 may include a silicon oxide layer and a silicon nitride layer, and the silicon oxide layer and the silicon nitride layer included in the first encapsulation layer EN1 have different types of layer stress. Accordingly, in such an embodiment, the first encapsulation layer EN1 may have the compressive stress value of about 0 MPa, or the first encapsulation layer EN1 may be in a neutral state in which the first encapsulation layer EN1 does not have compressive stress and tensile stress as layer stress of the entire first encapsulation layer EN1 is canceled.

In an embodiment, the first encapsulation layer EN1 may have a first modulus, and the bank layer 126 including the spacer SC and the pixel defining layer PDL may have a second modulus. The first modulus and the second modulus may have different values depending on the constituent materials thereof.

In an embodiment, the first modulus may be greater than the second modulus. In such an embodiment, rigidity or strength of the first encapsulation layer EN1 may be greater than rigidity or strength of the bank layer 126, respectively.

Accordingly, in such an embodiment, a raising of the top surface of the pixel defining layer PDL disposed between the first spacer SC1 and the second spacer SC2 may be formed by the first encapsulation layer EN1 stacked on the top surface of the pixel defining layer PDL disposed between the first spacer SC1 and the second spacer SC2, and to serve to support a curved surface when the curved surface is generated in the sixth conductive layer 180 disposed on the top surface of the pixel defining layer PDL due to the raised portion UP.

The second encapsulation layer EN2 may include an organic material. Although not limited thereto, the organic material may include, for example, an organic insulating material such as a polyacrylates resin, an epoxy resin, a phenolic resin, a polyamides resin, a polyimides resin, an unsaturated polyesters resin, a poly phenyleneethers resin, a polyphenylenesulfides resin, or benzocyclobutene (BCB).

Hereinafter, the raised portion UP and the depression portion DP formed by the spacers SC disposed close to each other will be described in detail.

Figure 6:
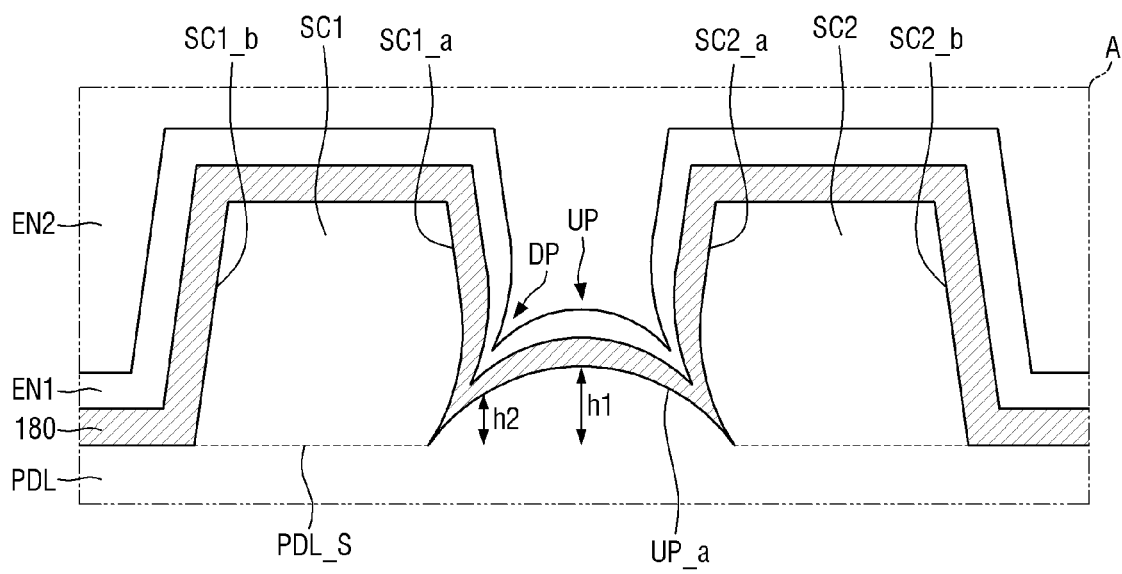
FIG. 6 is an enlarged view of region A of FIG. 5.

FIG. 6 is an enlarged view of region A of FIG. 5.

Referring to FIG. 6, the opposite inclined surface SC1_a of the first spacer SC1 and the opposite inclined surface SC2_a of the second spacer SC2 may partially include a curved surface and a portion of the pixel defining layer PDL disposed between the first spacer SC1 and the second spacer SC2 may include a raised portion UP having a convex curved surface in the thickness direction.

The depression portions DP may be formed in regions where a lower region of the opposite inclined surface SC1_a of the first spacer SC1 and a lower region of the opposite inclined surface SC2_a of the second spacer SC2 meet a top surface UP_a of the raised portion UP between the first spacer SC1 and the second space SC2.

In an embodiment, the depression portion DP may be defined by the opposite inclined surface SC1_a or SC2_a of the spacer SC1 or SC2 and the top surface UP_a of the raised portion UP. In an embodiment, the depression portions DP may be formed in the regions where the lower regions of the opposite inclined surface SC1_a of the first spacer SC1 and the opposite inclined surface SC2_a of the second spacer SC2 meet both ends of the top surface UP_a of the raised portion UP, and the depression portion DP may include one side surface formed by the opposite inclined surface SC1_a or SC2_a of the spacer SC1 or SC2 and the other side surface formed by the top surface UP_a of the raised portion UP. A width between one side surface and the other side surface of the depression portion DP decreases from an upper region to a lower region of the depression portion DP, and one side surface and the other side surface of the depression portion DP may overlap at an end of the depression portion DP.

In an embodiment, the end of the depression portion DP may be positioned on the same line or plane as the top surface PDL_S of the pixel defining layer PDL positioned outside the spacer group SCG (or not between the first spacer SC1 and the second space SC2). However, the disclosure is not limited thereto, and in another embodiment, the end of the depression portion DP may be positioned at a lower position than the top surface PDL_S of the pixel defining layer PDL positioned outside the spacer group SCG.

The top surface UP_a of the raised portion UP may be positioned at a higher position than the top surface PDL_S of the pixel defining layer PDL positioned outside the spacer group SCG. In an embodiment, a central portion of the top surface UP_a of the raised portion UP may be positioned at a first height h1 based on the top surface PDL_S of the pixel defining layer PDL positioned outside the spacer group SCG, and the top surface UP_a of the raised portion UP adjacent to the depression portion DP may be positioned at a second height h2. The first height h1 may be positioned higher than the second height h2, and the first height h1 may be in a range of about 0.3 μm to about 5 μm, but is not limited thereto.

The sixth conductive layer 180, the first encapsulation layer EN1, and the second encapsulation layer EN2 may be sequentially disposed on the surfaces of the first spacer SC1, the second spacer SC2, and the raised portion UP, and the depression portion DP.

Referring to FIG. 6, in an embodiment, the sixth conductive layer 180 may be disposed along the surface of the spacer SC and the top surface UP_a of the raised portion UP. In such an embodiment, the sixth conductive layer 180 may be in direct contact with the top surface UP_a of the raised portion UP disposed between the first spacer SC1 and the second spacer SC2, and the sixth conductive layer 180 disposed on the top surface UP_a of the raised portion UP may include a curved surface having a convex shape in the thickness direction.

The first encapsulation layer EN1 disposed on the top surface UP_a of the raised portion UP may include a top surface in contact with the second encapsulation layer EN2 and a bottom surface in contact with the sixth conductive layer 180, a curvature of the top surface of the first encapsulation layer EN1 may be greater than a curvature of the bottom surface of the first encapsulation layer EN1, and a radius of curvature of the top surface of the first encapsulation layer EN1 may be smaller than a radius of curvature of the bottom surface of the first encapsulation layer EN1.

The first insulating layer EN1 may be disposed on the sixth conductive layer 180. In an embodiment, the first encapsulation layer EN1 may be disposed on the top surface, the opposite inclined surface SC1_a or SC2_a, and the other inclined surface SC1_b or SC2_b of the spacer SC1 or SC2, the width of the first encapsulation layer EN1 disposed on the top surface and the other inclined surface SC1_b or SC2_b of the spacer SC1 or SC2 in the thickness direction may be substantially constant, and an outer inclined surface of the first encapsulation layer EN1 disposed on the other inclined surface SC1_b or SC2_b of the spacer SC1 or SC2 may include a forward tapered inclined surface.

In an embodiment, an outer inclined surface of the first encapsulation layer EN1 disposed on the opposite inclined surface SC1_a or SC2_a of the spacer SC1 or SC2 may include a curved surface, a width of the first encapsulation layer EN1 disposed on an upper region of the opposite inclined surface SC1_a or SC2_a of the spacer SC1 or SC2 in the thickness direction may be greater than a width of the first encapsulation layer EN1 disposed on a lower region of the opposite inclined surface SC1_a or SC2_a of the spacer SC1 or SC2 in the thickness direction, and at least a portion of the first encapsulation layer EN1 disposed on the opposite inclined surface SC1_a or SC2_a of the spacer SC1 or SC2 may protrude outward from the first encapsulation layer EN1 disposed on the depression portion DP.

Therefore, at least a portion of the first encapsulation layer EN1 disposed on the opposite inclined surface SC1_a or SC2_a of the spacer SC1 or SC2 may cover at least a portion of the first encapsulation layer EN1 disposed on the depression portion DP in a plan view.

Although not illustrated, in an alternative embodiment, the sixth conductive layer 180 may not be disposed on at least some regions of the spacer SC and the raised portion UP, and in such an embodiment, the first encapsulation layer EN1 may be in direct contact with the raised portion UP or the spacer SC1 or SC2.

The second encapsulation layer EN2 may be disposed on the first encapsulation layer EN1 and may form a tip portion protruding toward the depression portion DP in a spaced space between the first spacer SC1 and the second spacer SC2.

As illustrated in FIG. 6, in an embodiment where the width between one side surface and the other side surface of the depression portion DP decreases from the upper region to the lower region of the depression portion DP, widths of the sixth conductive layer 180 and the first encapsulation layer EN1 disposed on the depression portion DP may also decrease from the upper region to the lower region of the depression portion DP.

In an embodiment, the tip portion protruding toward the depression portion DP in the spaced space between first spacer SC1 and the second spacer SC2 may have a width in the thickness direction that decreases toward an end thereof.

Figure 7:
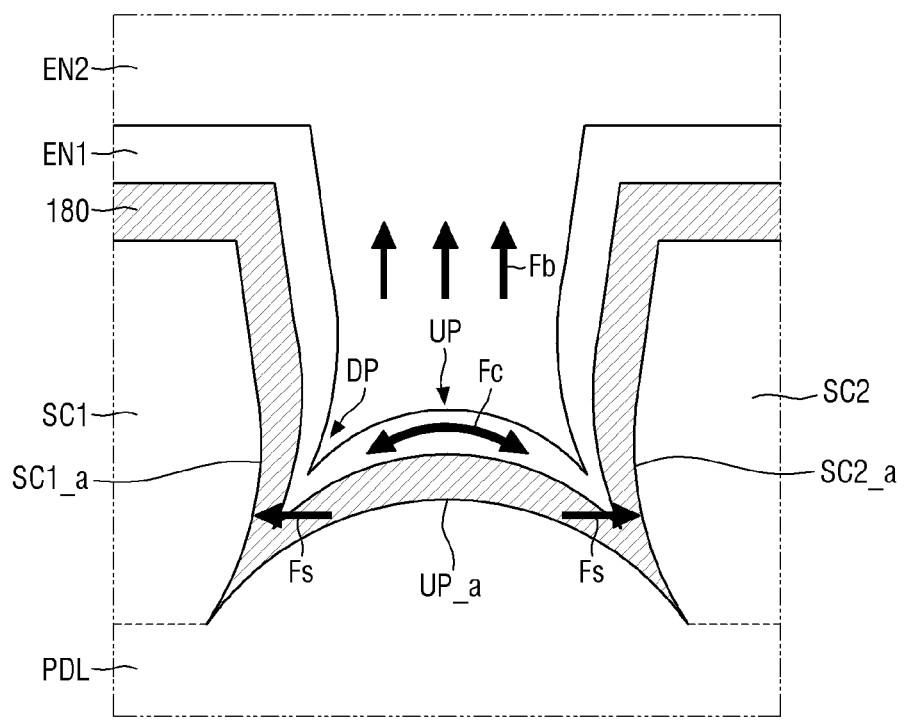
FIG. 7 is a schematic view for explaining an improvement in adhesion of an encapsulation layer in the display device according to an embodiment.

FIG. 7 is a schematic view for explaining an improvement in adhesion of an encapsulation layer in the display device according to an embodiment.

When the display device 1 is bent (refer to FIGS. 1 and 2), bending stress may be applied to the encapsulation layer ENL. When the bending stress is applied to the encapsulation layer ENL, a force to peel the first encapsulation layer EN1 and the second encapsulation layer EN2 from the spacer SC and the raised portion UP may act, and such a peeling force Fb is generally directed in a vertical direction.

A force Fc that pushes in a horizontal direction is generated by compressive stress between the inorganic materials in the first encapsulation layer EN1 disposed on the top surface UP_a of the raised portion UP, and accordingly, a repulsive force Fs that horizontally pushes a lower region between the first spacer SC1 and the second spacer SC2 is generated.

As described above, a shear force due to a strong repulsive force Fs may be formed in the lower regions of the opposite inclined surfaces SC1_a and SC2_a of the first spacer SC1 and the second spacer SC2 to provide resistance to the peeling force Fb in the vertical direction, thereby weakening the peeling force Fb.

In an embodiment, the outer inclined surface of the first encapsulation layer EN1 disposed on the opposite inclined surface SC1_a or SC2_a of the spacer SC1 or SC2 covers the sixth conductive layer 180, the first encapsulation layer EN1, and the second encapsulation layer EN2 positioned on the depression portion DP on a lower side thereof, and thus acts as direct resistance to the peeling force Fb. In addition, since a larger contact area is provided through the outer inclined surface of the first encapsulation layer EN1, the resistance due to friction may also be provided to the peeling force Fb.

In addition, since the sixth conductive layer 180, the first encapsulation layer EN1, and the second encapsulation layer EN2 disposed on the depression portion DP have the widths in the thickness direction that decrease toward the lower region of the depression portion DP, adhesion between the sixth conductive layer 180, the first encapsulation layer EN1, and the second encapsulation layer EN2 may be improved, thereby suppressing or preventing the encapsulation layer ENL from being peeled from the depression portion DP.

As a result, by increasing the resistance to the peeling force Fb acting in the vertical direction, the peeling force Fb may be weakened, and the adhesion of the encapsulation layer ENL may be improved. In such an embodiment, the adhesion between the first encapsulation layer EN1 and the sixth conductive layer 180 and the adhesion between the first encapsulation layer EN1 and the second encapsulation layer EN2 may be improved.

Hereinafter, other alternative embodiments will be described. In the following embodiments, any repetitive detailed description of the same configurations as those of the embodiment described above will be omitted or simplified and configurations different from those of the embodiment described above will be mainly described.

Figure 8:
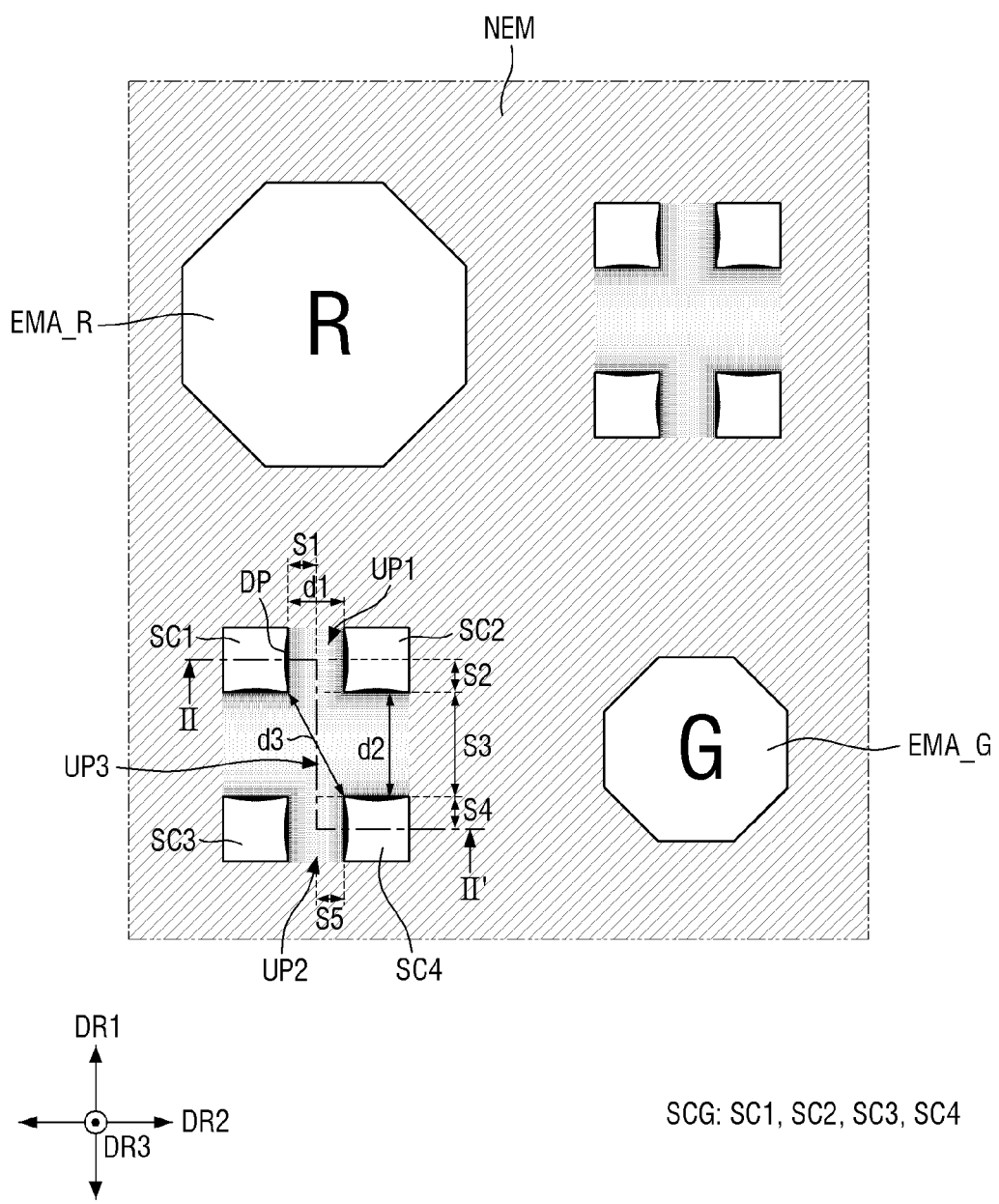
FIG. 8 is a schematic plan view illustrating a portion of a display unit of a display device according to an alternative embodiment.

FIG. 8 is a schematic plan view illustrating a portion of a display unit of a display device according to an alternative embodiment.

A display device shown in FIG. 8 is substantially the same as the display device in FIG. 4 except that a first spacer SC1 to a fourth spacer SC4 included in a plurality of spacer groups SCG are arranged in a matrix shape to be spaced apart from each other along the first direction DR1 and the second direction DR2 in a plan view, and the display device includes a first raised portion UP1 included in a non-emission region NEM between the first spacer SC1 and the second spacer SC2 arranged in a first row and a second raised portion UP2 included in a non-emission region NEM between the third spacer SC3 and the fourth spacer SC4 arranged in a second row, and a third raised portion UP3 included in a non-emission region NEM of a central portion in which the first spacer SC1 to the fourth space SC4 are arranged in the matrix shape.

Figure 9:
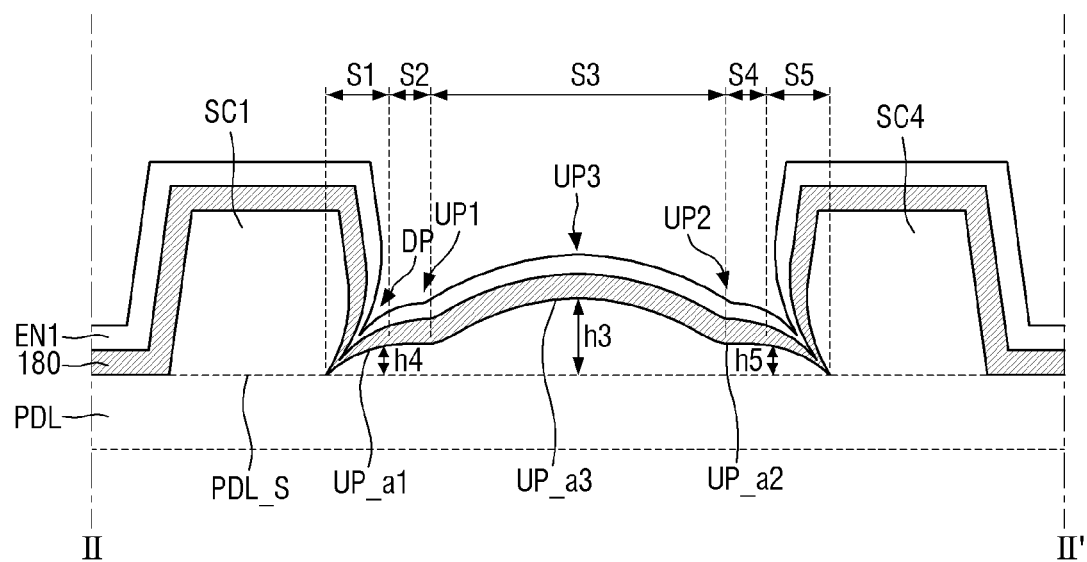
FIG. 9 is a cross-sectional view taken along line II-IF of FIG. 8.

FIG. 9 is a cross-sectional view taken along line II-IF of FIG. 8.

In the cross-sectional view of FIG. 9, for convenience of illustration, most of the layers on the lower side of the pixel defining layer PDL are omitted, and the structures of the spacer SC and the raised portion UP are mainly illustrated.

Referring to FIGS. 8 and 9, the first raised portion UP1 included in the non-emission region NEM between the first spacer SC1 and the second spacer SC2 corresponds to a region 51 and a region S2, and the third raised portion UP3 included in the non-emission region NEM of the central portion in which the first spacer SC1 to the fourth spacer SC4 are arranged in the matrix shape corresponds to a region S3. In addition, the second raised portion UP2 included in the non-emission region NEM between the third spacer SC3 and the fourth spacer SC4 corresponds to regions S4 and S5.

In such an embodiment, a distance between the first spacer SC1 and the fourth spacer SC4 (or a distance between the second spacer SC2 and the third spacer SC3) d3 may be greater than distances d1 and d2 in the first direction DR1 and the second direction DR2, and a height of the raised portion UP included in the non-emission region NEM between the spacers SC may vary according to the relative distances d1 to d3 between the spacers SC. In such an embodiment, as the distances d1 to d3 between the spacers SC become shorter, the height of the raised portion UP included in the non-emission region NEM between the spacers SC may increase.

Referring to FIG. 9, top surfaces UP_a of the first raised portion UP1 to the third raised portion UP3 may be positioned at higher positions than the top surface PDL_S of the pixel defining layer PDL positioned outside the spacer SC. In this case, central portions of the top surface UP_a1 of the first raised portion UP1 and the top surface UP_a2 of the second raised portion UP2 may be positioned at a fourth height h4 and a fifth height h5 with respect to the top surface PDL_S of the pixel defining layer PDL positioned outside the spacer SC, respectively, and a central portion of the top surface UP_a3 of the third raised portion UP3 may be positioned at a third height h3.

Since the distances d1 and d2 between the spacers SC in the first direction DR1 and the second direction DR2 are the same as each other, the height h4 of the central portion of the top surface UP_a1 of the first raised portion UP1 and the height h5 of the central portion of the top surface UP_a2 of the second raised portion UP2 may be positioned at a same height.

The distance between the first spacer SC1 and the fourth spacer SC4 (or the distance between the second spacer SC2 and the third spacer SC3) d3 is greater than the distances d1 and d2 between the spacers SC in the first direction DR1 and the second direction DR2, but since a raising force in a region between the first spacer SC1 and the fourth spacer SC4 and a raising force in a region between the second spacer SC2 and the third spacer SC3 overlap in the third raised portion UP3, the height h3 of the central portion of the top surface UP_a3 of the third raised portion UP3 may be positioned at a position higher than the fourth height h4 and the fifth height h5.

Figure 10:
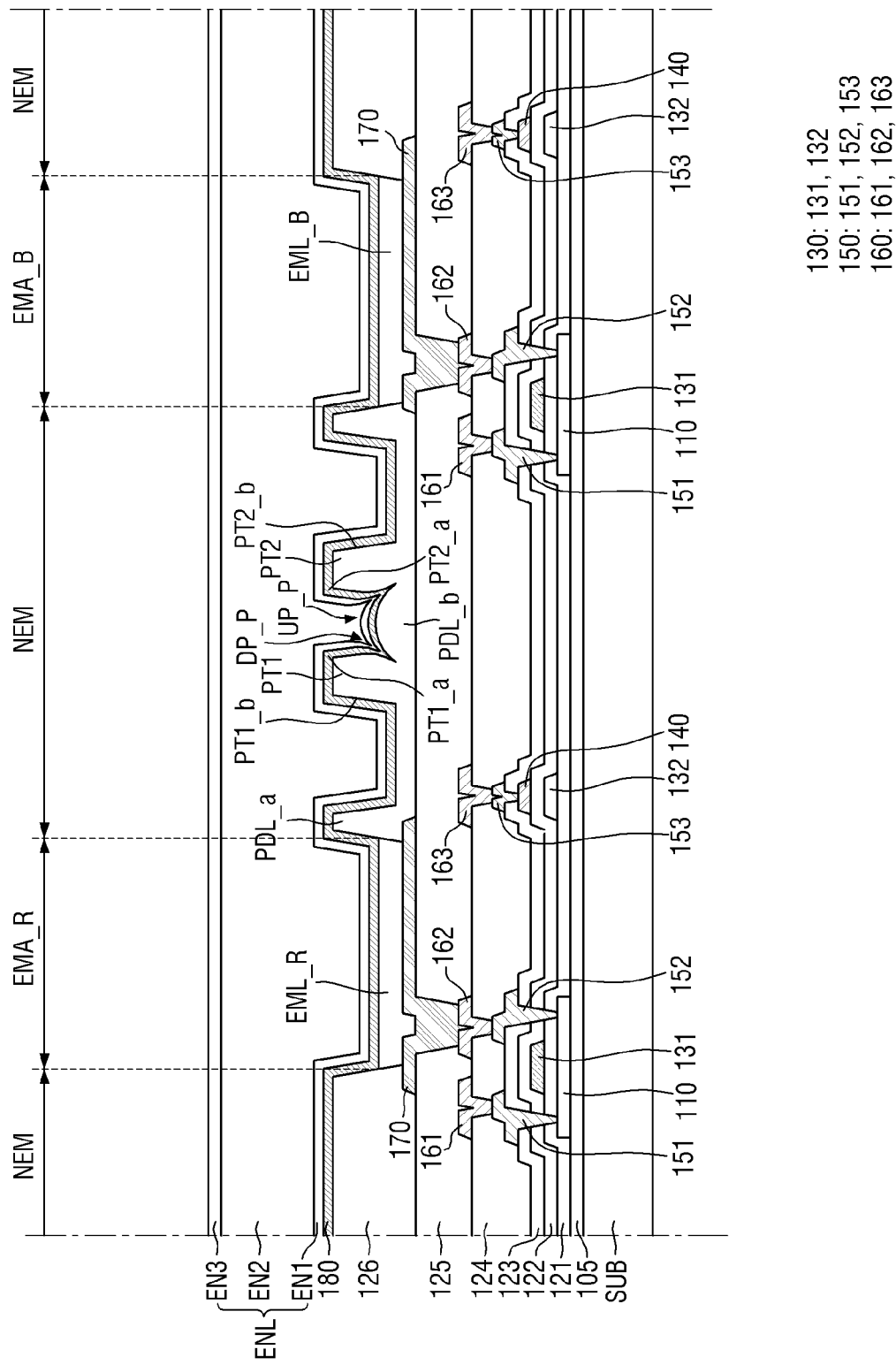
FIG. 10 is a cross-sectional view of a display device according to another alternative embodiment.

FIG. 10 is a cross-sectional view of a display device according to another alternative embodiment.

A display device shown in FIG. 10 is substantially the same as the display device in FIG. 4 except that a raised portion UP_P and a protrusion portion PT may be included in the pixel defining layer PDL included in the bank layer 126.

The pixel defining layer PDL disposed in the non-emission region NEM may include a pixel defining layer portion PDL_a, a base portion PDL_b, and at least two protrusion portions PT1 and PT2 disposed on the base portion PDL_b and protruding in the thickness direction from the base portion PDL_b.

As illustrated in FIG. 10, a first protrusion portion PT1 and a second protrusion portion PT2 are disposed to be spaced apart from each other in the horizontal direction. The pixel defining layer PDL may include a region in which the protrusion portion PT1 or PT2 is disposed and a region in which the protrusion portion PT1 or PT2 is not disposed, and the regions may be alternately disposed for each section. Therefore, the pixel defining layer PDL may have a surface uneven shape depending on whether or not the protrusion portion PT1 or PT2 is disposed.

Side surfaces of the first protrusion portion PT1 and the second protrusion portion PT2 may be placed on a plane perpendicular to the substrate SUB, one inclined surface PT1_a or PT2_a thereof may include a partially curved inclined surface, and the other inclined surface PT1_b or PT2_b thereof may include a forward tapered inclined surface. However, the disclosure is not limited thereto, and the other inclined surface PT1_b or PT2_b of the protrusion portion PT1 or PT2 may also include a reverse tapered inclined surface or a curved inclined surface.

A top surface of the protrusion portion PT1 or PT2 may have a same height as a top surface of the pixel defining layer portion PDL_a but is not limited thereto. In an alternative embodiment, the height of the top surface of the protrusion portion PT1 or PT2 may be lower or higher than the height of the top surface of the pixel defining layer portion PDL_a. In an embodiment, as shown in FIG. 10, the heights of the top surfaces of the first protrusion portion PT1 and the second protrusion portion PT2 are the same as each other, but the disclosure is not limited thereto.

The pixel defining layer portion PDL_a may have a cross-section having a forward tapered shape, but is not limited thereto, and may also include a reverse tapered inclined surface or a curved inclined surface.

In an embodiment, a distance between the pixel defining layer portion PDL_a and the protrusion portion PT1 or PT2 may be greater than a distance between the first protrusion portion PT1 and the second protrusion portion PT2, and in such an embodiment, the distance between the first protrusion portion PT1 and the second protrusion portion PT2 may be in a range of about 0.5 µm to about 8 µm. However, the disclosure is not limited thereto.

A top surface of the base portion PDL_b between the pixel defining layer portion PDL_a and the protrusion portion PT1 or PT2 may include a flat surface, and a top surface of the base portion PDL_b between the first protrusion portion PT1 and the second protrusion portion PT2 may include a raised portion UP_P including a curved surface that is convex in the thickness direction.

In an embodiment, depression portions DP_P may be included in a lower region of the one inclined surface PT1_a of the first protrusion portion PT1 and a lower region of the one inclined surface PT2_a of the second protrusion portion PT2.

In such an embodiment, the peeling force Fb acting in the vertical direction may be weakened and the adhesion of the encapsulation layer ENL may be improved by the shear force acting on the depression portion DP_P and the one inclined surface PT1_a or PT2_a of the protrusion portion PT1 or PT2, thereby improving mechanical stability and reliability of the display device.

Hereinafter, a manufacturing method of the display device will be described in detail with reference to FIGS. 11 to 15.

FIGS. 11 to 15 are cross-sectional views showing processes in a manufacturing method of a display device according to an embodiment.

Figure 11:
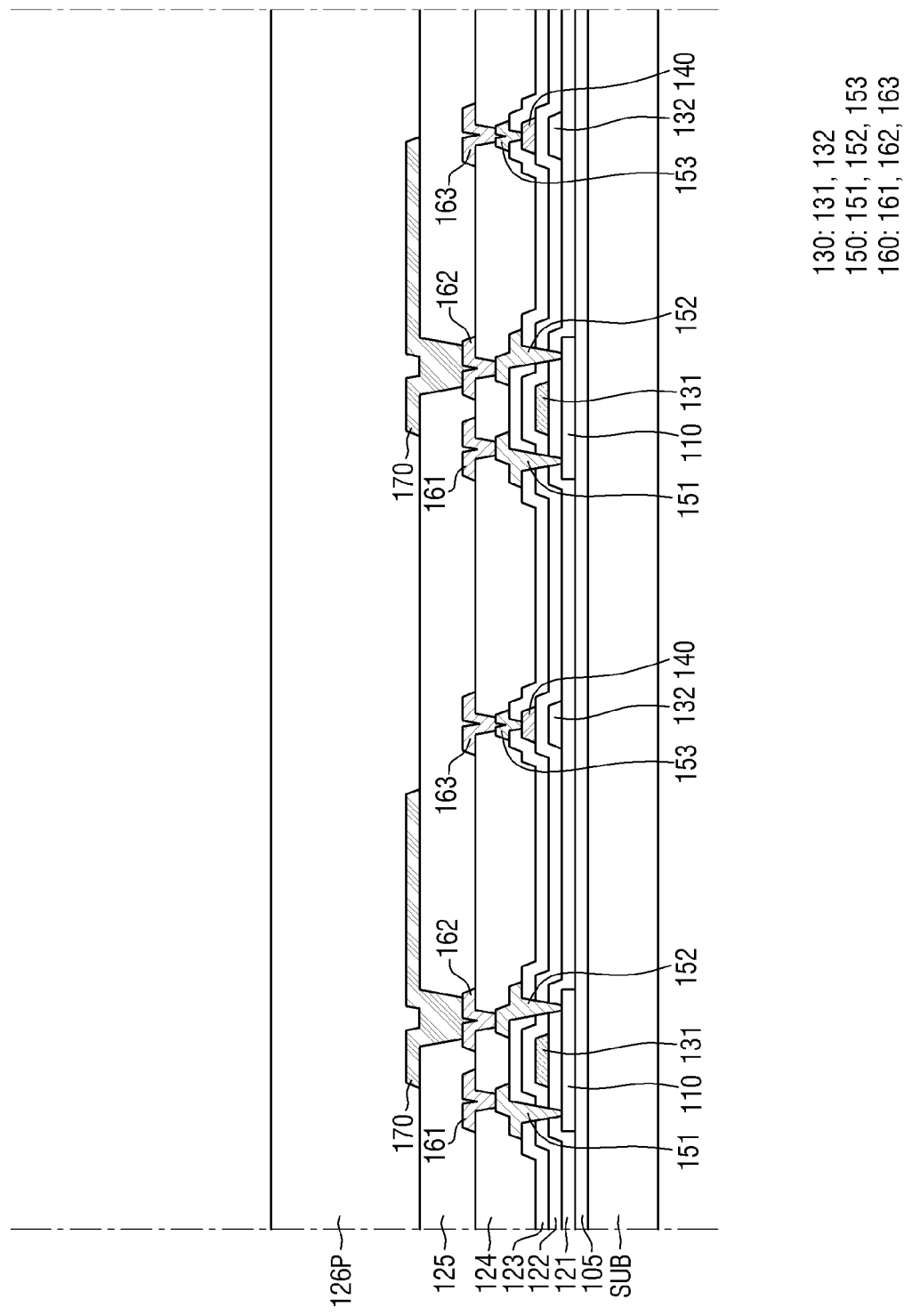
FIGS. 11 to 15 are cross-sectional views showing processes in a manufacturing method of a display device according to an embodiment.

Referring to FIG. 11, in an embodiment of a manufacturing method of a display device, an intermediate structure, in which a buffer layer 105, a semiconductor layer 110, a first insulating layer 121, a first conductive layer 130, a second insulating layer 122, a second conductive layer 140, a third insulating layer 123, a third conductive layer 150, a fourth insulating layer 124, a fourth conductive layer 160, a fifth insulating layer 125, and a fifth conductive layer 170 are sequentially stacked on a substrate SUB, is prepared. Since various methods of forming such an intermediate structure are widely known in the art, a detailed description thereof will be omitted.

Next, an organic material layer 126p for a bank layer is provided or stacked on the fifth conductive layer 170, and the organic material layer 126p for the bank layer is patterned by performing exposure and development using a halftone mask (HFM).

Figure 12:
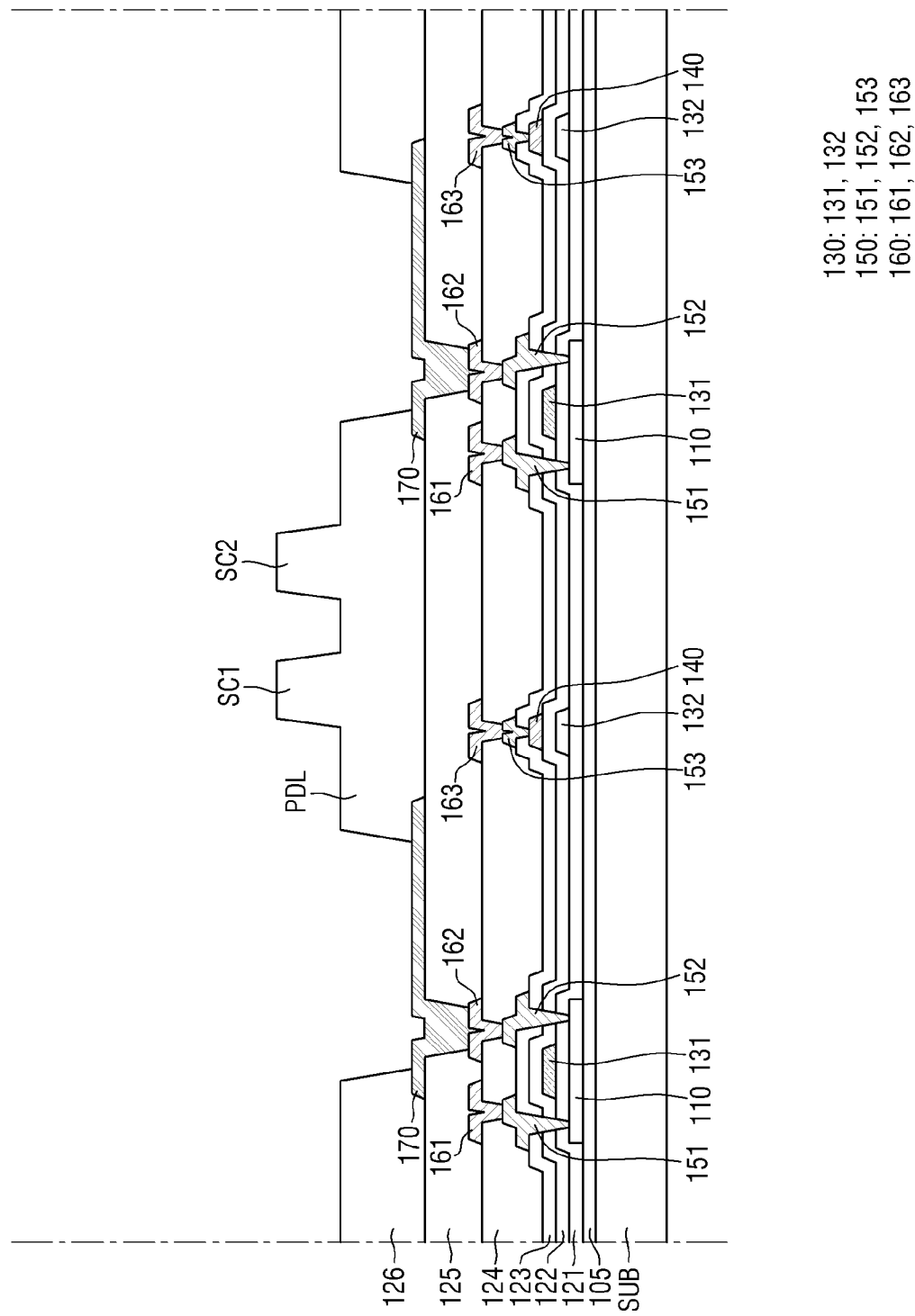

Next, the exposed organic material layer 126p for the bank layer is developed to complete pattern shapes of a pixel defining layer PDL, a pixel defining layer PDL opening, and a spacer SC as illustrated in FIG. 12. As such, when the process is performed using the halftone mask HFM, the bank layer 126 including the pixel defining layer PDL, the pixel defining layer PDL opening, the first spacer SC1, and the second spacer SC2 may be simultaneously formed in one process, and process efficiency may be thus improved. However, the disclosure is not limited thereto, and the pattern shapes of the pixel defining layer PDL, the pixel defining layer PDL opening, and the spacer SC may also be formed by different mask processes, respectively.

Figure 13:
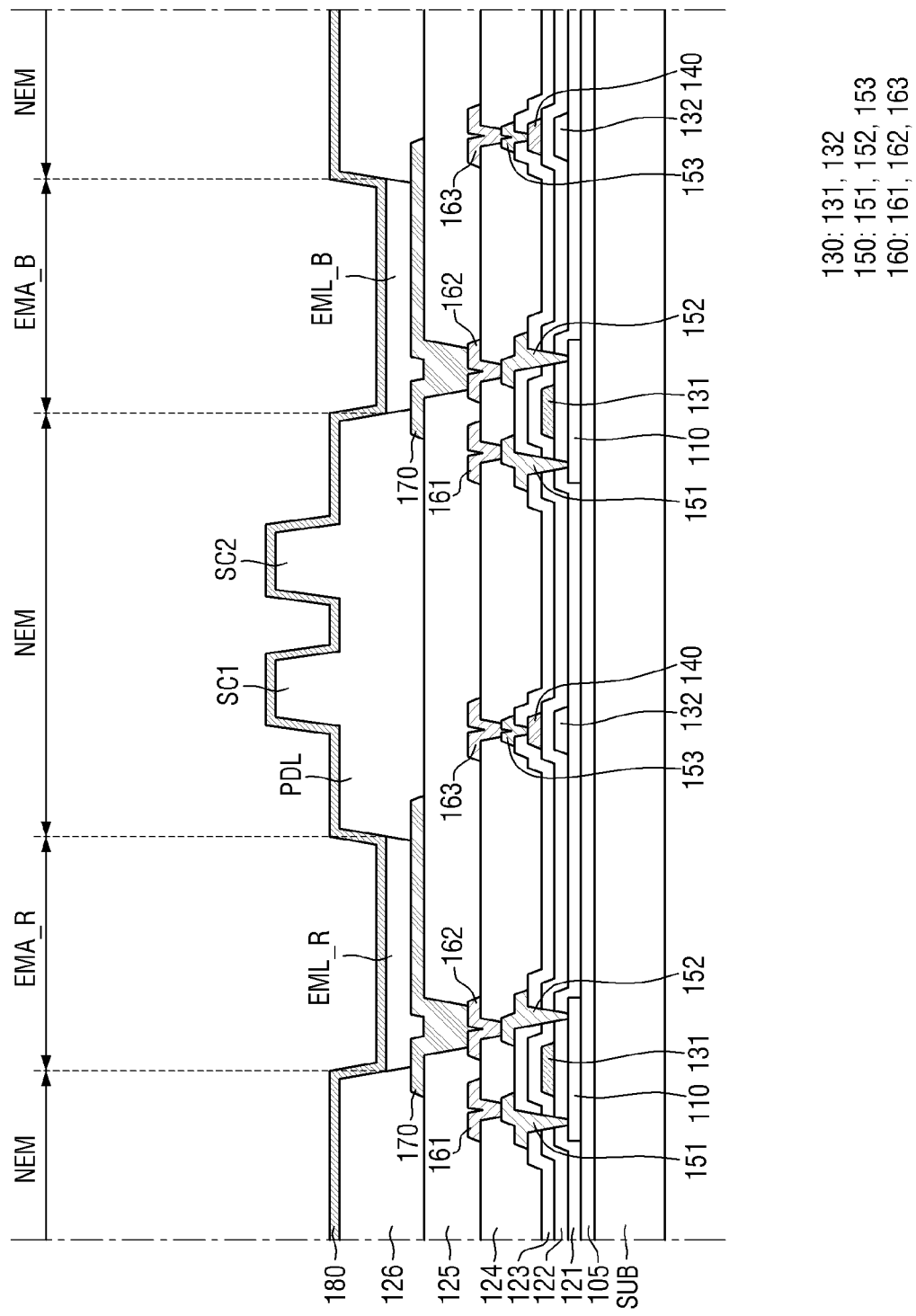

Next, referring to FIG. 13, a light emitting layer EML is provided or formed in the opening of the pixel defining layer PDL exposing the fifth conductive layer 170.

After the light emitting layer EML is formed, a sixth conductive layer 180 is provided. In an embodiment, the sixth conductive layer 180 is entirely formed on the light emitting layer EML and the bank layer 126.

Figure 14:
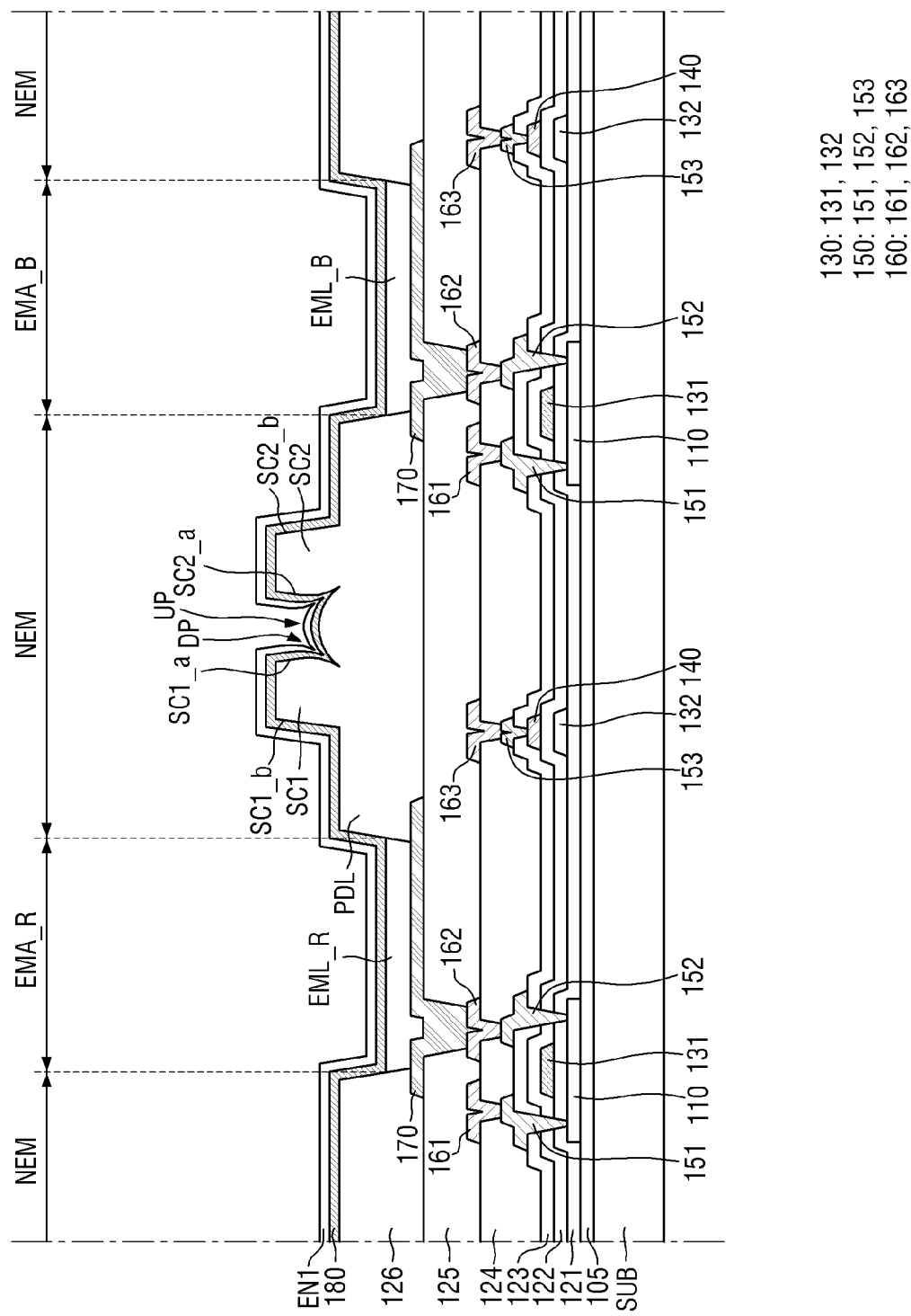

Next, referring to FIG. 14, a first encapsulation layer EN1 is provided or formed on the sixth conductive layer 180. The first encapsulation layer EN1 is formed by various chemical vapor deposition (CVD) methods, such as a plasma enhanced CVD (PECVD) method, an atmospheric pressure CVD (APCVD) method, and a low pressure CVD (LPCVD) method. As the first encapsulation layer EN1 is formed, opposite inclined surfaces SC1_a and SC2_a of the first spacer SC1 and the second spacer SC2, depression portions DP in lower regions of the opposite inclined surfaces SC1_a and SC2_a of the first spacer SC1 and the second spacer SC2, and a raised portion UP having a convex shape in the thickness direction between the first spacer SC1 and the second spacer SC2 are completed.

A detailed description of a process of forming the raised portion UP having the convex shape in the thickness direction between the first spacer SC1 and the second spacer SC2 will be described later with reference to FIGS. 16 to 18.

Figure 15:
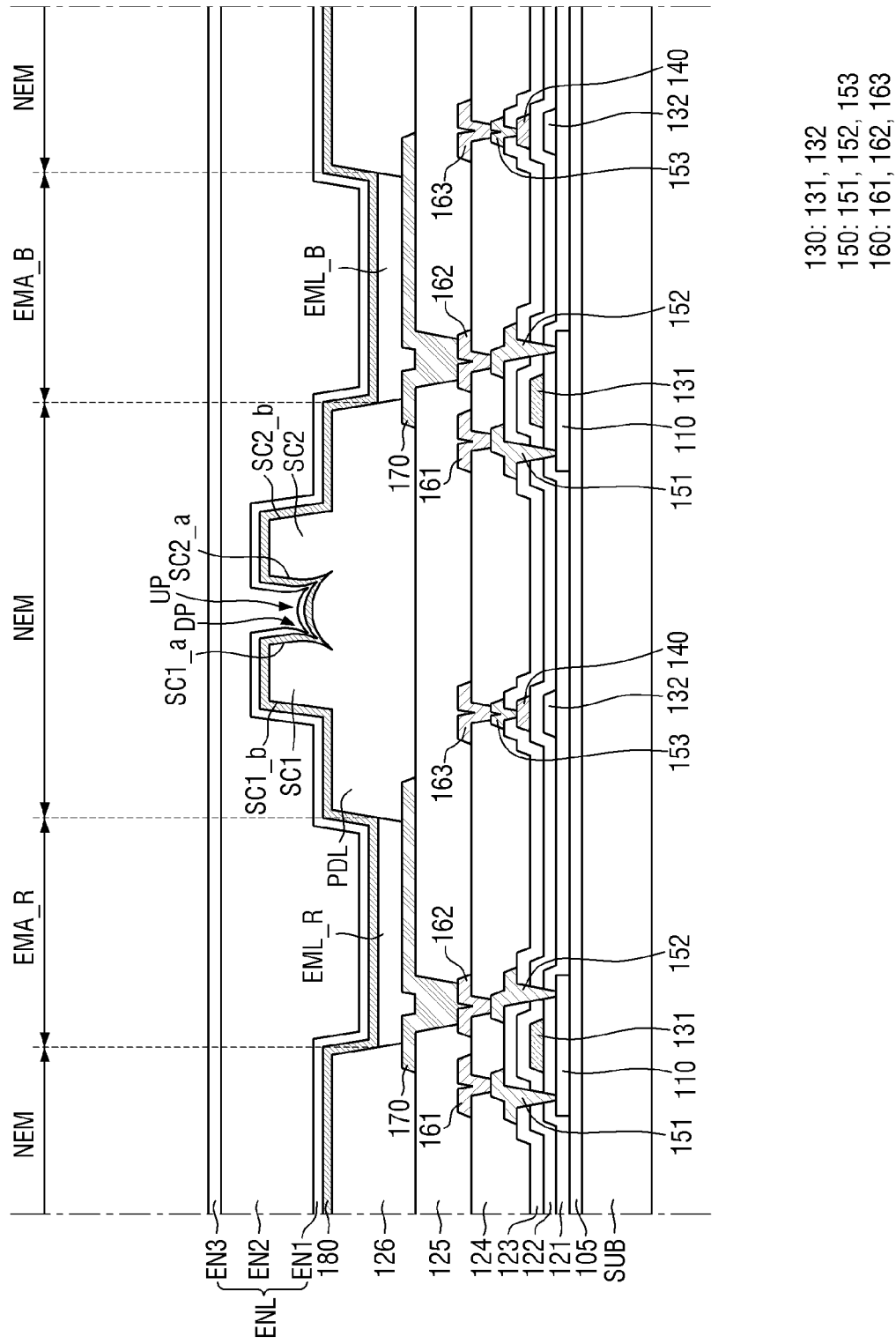

Next, referring to FIG. 15, the display device as illustrated in FIG. 4 is completed by forming a second encapsulation layer EN2 and a third encapsulation layer EN3 on the first encapsulation layer EN1 by various methods known in the art.

Figure 16:
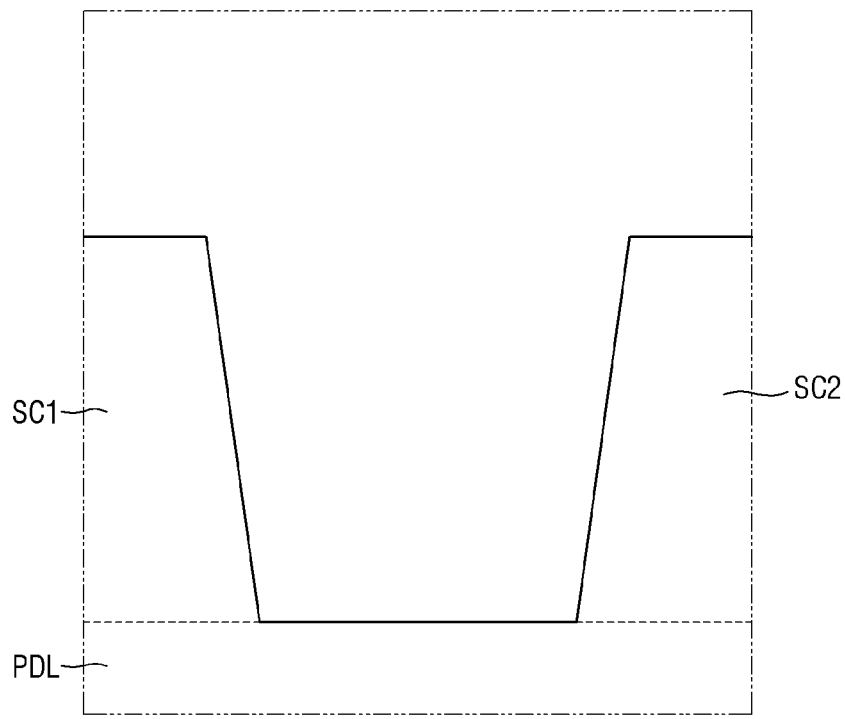
FIGS. 16 to 18 are cross-sectional views illustrating a process of forming a raised portion according to an embodiment.
Figure 17:
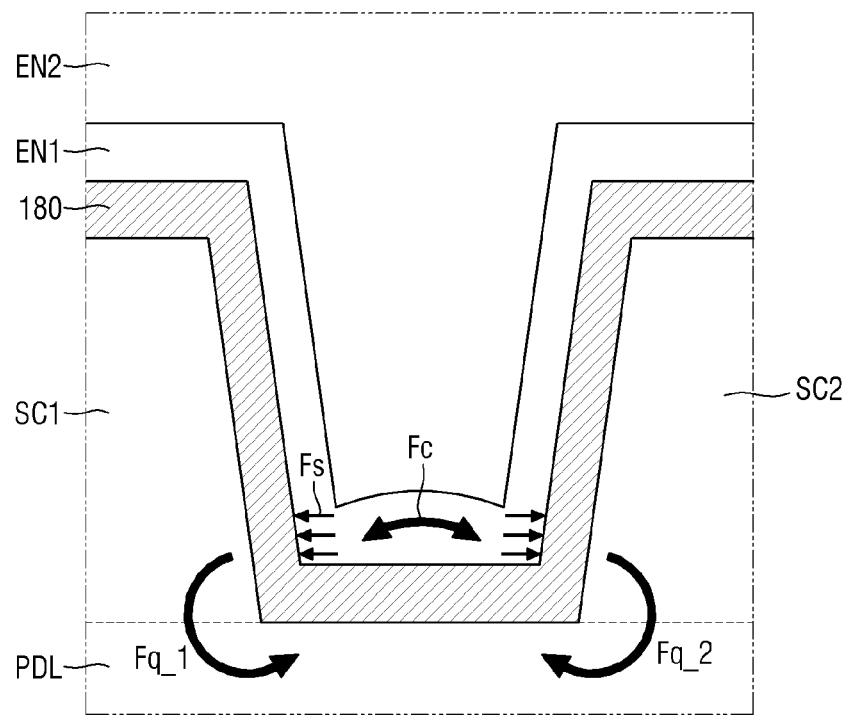
Figure 18:
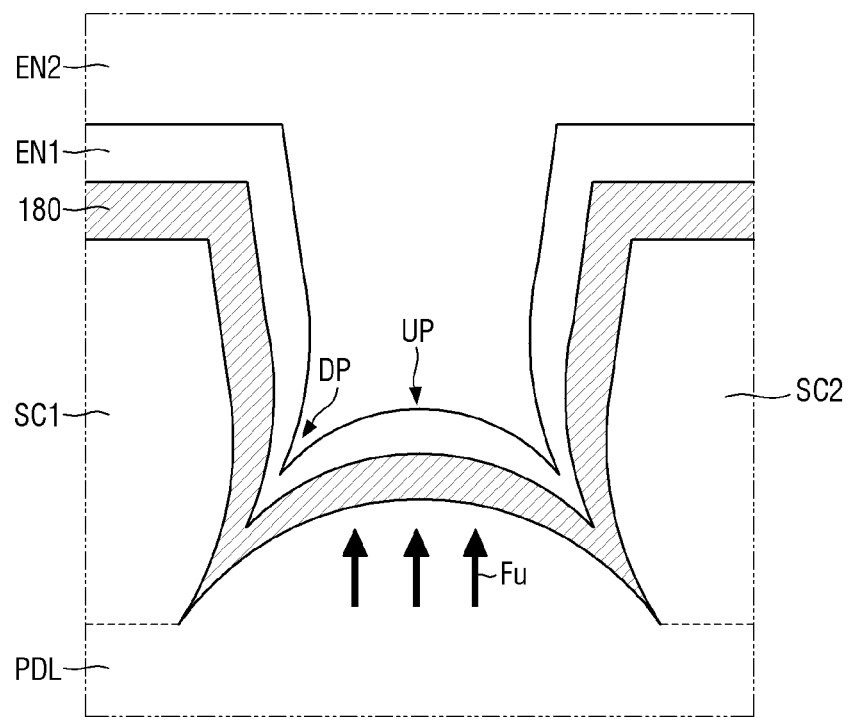

FIGS. 16 to 18 are cross-sectional views illustrating a process of forming a raised portion UP according to an embodiment.

Referring to FIG. 16, the first spacer SC1 and the second spacer SC2 adjacent to each other are disposed to be spaced apart from each other on the pixel defining layer PDL, and no external force is applied to a lower region between the first spacer SC1 and the second spacer SC2, and accordingly, a top surface of the pixel defining layer PDL disposed between the first spacer SC1 and the second spacer SC2 has a flat surface.

In this case, a spaced distance between the first spacer SC1 and the second spacer SC2 may be in a range of about 0.5 µm to about 8 µm. If the spaced distance between the first spacer SC1 and the second spacer SC2 is out of the range described above, a horizontal force is not generated due to compressive stress between the inorganic materials stacked between the first spacer SC1 and the second spacer SC2. Accordingly, since no external force is applied to the lower region of the first spacer SC1 and the second spacer SC2, the top surface of the pixel defining layer PDL disposed between the first spacer SC1 and the second spacer SC2 may maintain a flat state.

Referring to FIG. 17, in an embodiment, after the sixth conductive layer 180 is formed on the first spacer SC1, the second spacer SC2, and the top surface of the pixel defining layer PDL disposed between the first spacer SC1 and the second spacer SC2, the first encapsulation layer EN1 is deposited on the sixth conductive layer 180 by chemical vapor deposition (CVD) method. In this process, the first encapsulation layer EN1 is formed to be conformal to a surface shape of the sixth conductive layer 180 with a thin thickness.

In an embodiment, the first encapsulation layer EN1 deposited on the sixth conductive layer 180 has a compressive stress, e.g., a compressive stress value of about −500 MPa or more and less than about 0 MPa, that is, in a range of about −500 MPa to about 0 MPa. In such an embodiment, the compressive stress acts as a force in a direction in which the first encapsulation layer EN1 is pushed and a force Fc in a direction in which the first encapsulation layer EN1 is bent downward.

If the compressive stress is out of the above-described numerical range, a layer quality of a layer formed on the first encapsulation layer EN1 may be deteriorated, thereby deteriorating electrical characteristics of the display device, or dislocation may occur due to excessive stress at an interface between an upper portion of the first encapsulation layer EN1 and another thin layer formed thereon, and it may be difficult to form the raised portion UP between the first spacer SC1 and the second spacer SC2 only through the deposition process of the first encapsulation layer EN1.

In addition, if the modulus of the first encapsulation layer EN1 is smaller than the modulus of the bank layer 126 including the spacer SC and the pixel defining layer PDL, the spacer SC and the pixel defining layer PDL have greater rigidity or strength than the first encapsulation layer EN1, which may make it difficult to generate strong raising between the first spacer SC1 and the second spacer SC2 only through the deposition process of the first encapsulation layer EN1. Therefore, in an embodiment, the first encapsulation layer EN1 has a larger modulus than that of the bank layer 126 including the spacers SC and the pixel defining layer PDL, such that a desired raised portion UP may be implemented between the first spacer SC1 and the second spacer SC2 only through the deposition process of the first encapsulation layer EN1.

When the compressive stress acts as described above, a force for maximally pushing the inorganic materials between the inorganic materials in both horizontal directions may be generated, and a repulsive force Fs that horizontally pushes the lower regions of the first spacers SC1 and the second spacers SC2, that is, the lower regions of the opposite inclined surfaces of the first and second spacers SC1 and SC2, may be generated by a force Fc that horizontally pushes at both edge portions of the first encapsulation layer EN1 deposited on the sixth conductive layer 180.

As described above, when the repulsive force Fs that horizontally pushes the lower regions of the opposite inclined surfaces of the first spacer SC1 and the second spacer SC2 is generated, a counterclockwise torque Fq_1 may be generated in the lower region of the first spacer SC1, and a clockwise torque Fq_2 may be generated in the lower region of the second spacer SC2.

Referring to FIG. 18, as the counterclockwise torque Fq_1 generated in the lower region of the first spacer SC1 and the clockwise torque Fq_2 generated in the lower region of the second spacer SC2 overlap the central portion of the top surface of the pixel defining layer PDL disposed between the first spacer SC1 and the second spacer SC2, the torque Fq_1 and the torque Fq_2 may act as a force Fu to raise the central portion of the top surface of the pixel defining layer PDL disposed between the first spacer SC1 and the second spacer SC2 in the thickness direction to form the raised portion UP.

The raised portion UP, the depression portion DP, and the shear force formed in this way may contribute to improving the adhesion between the first encapsulation layer EN1 and the sixth conductive layer 180 and the adhesion between the first encapsulation layer EN1 and the second encapsulation layer EN2 as described above.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
    a substrate;
    a first electrode disposed on the substrate;
    a bank layer including a pixel defining layer, through which an opening exposing at least a portion of the first electrode is defined, and a spacer group including a plurality of spacers disposed on the pixel defining layer;
    a light emitting layer disposed in the opening; and
    a first encapsulation layer covering the light emitting layer and the bank layer,
    wherein the bank layer includes a raised portion disposed between the plurality of spacers in the spacer group, and a depression portion disposed in a lower region of an opposite side surface opposite to another spacer of the spacer group among side surfaces of each spacer in the spacer group,
    the raised portion has a curved surface having a convex shape,
    the first encapsulation layer disposed on the curved surface of the raised portion of the bank layer includes a top surface and a bottom surface opposite to the top surface, wherein the top surface has a greater curvature than a curvature of the bottom surface, and
    the first encapsulation layer includes a first portion disposed on the depression portion and a second portion disposed on the side surface of the spacer, wherein at least a portion of the second portion is positioned outward from the first portion.

2. The display device of claim 1, wherein the second portion of the first encapsulation layer at least partially covers the first portion in a plan view.

3. The display device of claim 1, wherein the pixel defining layer and the spacer group including the plurality of spacers are integrally formed with each other as a single unitary and indivisible part.

4. The display device of claim 1, further comprising:
    a second encapsulation layer disposed on the first encapsulation layer; and
    a third encapsulation layer disposed on the second encapsulation layer.

5. The display device of claim 1, wherein the raised portion has a central portion positioned higher than one surface of the pixel defining layer positioned outside the spacer group.

6. The display device of claim 1, wherein the raised portion has a central portion having a height in a range of about 0.3 µm to about 5 µm with respect to one surface of the pixel defining layer positioned outside the spacer group.

7. The display device of claim 1, wherein the opposite side surface opposite to another spacer of the spacer group among the side surfaces of each spacer includes a curved portion.

8. The display device of claim 1, wherein the first encapsulation layer has a modulus greater than a modulus of the bank layer.

9. The display device of claim 4, wherein
the second encapsulation layer includes an organic material, and
the second encapsulation layer includes a tip portion protruding toward the depression portion in a space between the plurality of spacers in the spacer group.

10. The display device of claim 1, wherein the first encapsulation layer has a compressive stress in a range of about-500 MPa to about 0 MPa, or has a neutral stress of about 0 MPa.

11. The display device of claim 1, wherein the depression portion has a depth positioned at a same or lower position than one surface of the pixel defining layer positioned outside the spacer group.

12. The display device of claim 1, further comprising:
a second electrode interposed between the bank layer and the first encapsulation layer,
wherein the second electrodes fills the depression portion.

13. A display device comprising:
a substrate defining a plurality of emission regions and a non-emission region surrounding the emission regions, wherein the plurality of emission regions is arranged along a first direction and a second direction intersecting the first direction, and the non-emission region includes a first extension portion extending along the first direction around the emission region, a second extension portion extending along the second direction around the emission region, and an intersection portion where the first extension portion and the second extension portion intersect with each other;
a bank layer disposed on the substrate, wherein the bank layer includes a pixel defining layer covering the non-emission region and a plurality of spacers disposed on the pixel defining layer at the intersection portion; and
an inorganic layer disposed on the bank layer,
wherein the bank layer includes a raised portion disposed between the plurality of spacers of the intersection portion, and a depression portion disposed in a lower region of a side surface opposite to another spacer among side surfaces of each spacer,
the raised portion has a curved surface having a convex shape,
the inorganic layer includes a first portion disposed on the depression portion and a second portion disposed on the opposite side surface of the spacer, and
at least a portion of the second portion is positioned outward from the first portion.

14. The display device of claim 13, wherein the plurality of spacers are disposed in a matrix shape along a first direction and a second direction in a plan view at the intersection portion.

15. The display device of claim 14, wherein the raised portion includes a first raised portion and a second raised portion positioned between the plurality of spacers spaced apart from each other along the first direction and the second direction in the plan view, and a third raised portion positioned between the plurality of spacers spaced apart from each other along a diagonal direction intersecting the first direction and the second direction in the plan view,
wherein heights of a central portion of the first raised portion and a central portion of the second raised portion are the same as each other, and
a center portion of the third raised portion has a height higher than the heights of the center portion of the first raised portion and the center portion of the second raised portion.

16. The display device of claim 13, wherein an interval between the plurality of spacers is in a range of about 0.5 µm to about 8 µm.

17. The display device of claim 13, wherein
the plurality of spacers have different sizes from each other in a plan view, and
the plurality of spacers includes a curved shape in a plan view.

18. A manufacturing method of a display device, the manufacturing method comprising:
preparing a substrate;
providing a first electrode disposed on the substrate;
providing a bank layer on the substrate, wherein the bank layer includes a pixel defining layer, through which an opening exposing at least a portion of the first electrode is formed, and a spacer group including a plurality of spacers on the pixel defining layer;
providing a light emitting layer in the opening; and
providing a first encapsulation layer on the substrate to cover the light emitting layer and the bank layer,
wherein the bank layer includes a raised portion disposed between the plurality of spacers in the spacer group, and a depression portion disposed in a lower region of an opposite side surface opposite to another spacer of the spacer group among side surfaces of each spacer, wherein the raised portion has a curved surface having a convex shape.

19. The manufacturing method of claim 18, wherein the providing the first encapsulation layer is performed by a chemical vapor deposition method.

20. The manufacturing method of claim 18, further comprising:
providing a second encapsulation layer on the first encapsulation layer; and
providing a third encapsulation layer on the second encapsulation layer.

* * * * *